US011897277B2

(12) United States Patent
Barney et al.

(10) Patent No.: US 11,897,277 B2
(45) Date of Patent: Feb. 13, 2024

(54) SUBLIMATION SYSTEMS AND RELATED METHODS

(71) Applicant: Cricut, Inc., South Jordan, UT (US)

(72) Inventors: Kristy Lynn Barney, Lehi, UT (US); Desmond Kavanagh, Wicklow (IE); Bayden Filleul, Taumarunui (NZ); Jerome Tobin, Wicklow (IE); Mathew Bates, Dublin (IE); Peter Bevan, Wicklow (IE); Norman Stevenson, Dublin (IE)

(73) Assignee: Cricut, Inc., South Jordan, UT (US)

( * ) Notice: Subject to any disclaimer, the term of this patent is extended or adjusted under 35 U.S.C. 154(b) by 143 days.

(21) Appl. No.: 17/179,941

(22) Filed: Feb. 19, 2021

(65) Prior Publication Data

US 2022/0266618 A1 Aug. 25, 2022

(51) Int. Cl.
*B41M 5/035* (2006.01)

(52) U.S. Cl.
CPC ....... *B41M 5/0358* (2013.01); *B41P 2217/62* (2013.01)

(58) Field of Classification Search
CPC ...... G01D 5/145; H02K 11/215; H02K 11/33; B41F 17/006; B41M 5/0358; B41P 2217/62
See application file for complete search history.

(56) References Cited

U.S. PATENT DOCUMENTS 4,874,454 A 10/1989 Talalay et al.
5,108,537 A 4/1992 Garnes et al.
5,170,704 A 12/1992 Warren et al.
5,296,081 A 3/1994 Morin et al.
5,382,313 A 1/1995 Eminger
5,584,961 A 12/1996 Ellsworth et al.
5,622,577 A 4/1997 O'Connor
5,630,894 A 5/1997 Koch et al.
5,711,837 A 1/1998 Kantrowitz
5,802,969 A 9/1998 Wess et al.
(Continued)

FOREIGN PATENT DOCUMENTS

CA 2027976 A1 * 4/1991
CN 101229743 A 7/2008
(Continued)

OTHER PUBLICATIONS

International Search Report and Written Opinion, relating to Applicaiton No. PCT/US2022/016373, dated May 31, 2022.
(Continued)

*Primary Examiner* — Sonya M Sengupta
(74) *Attorney, Agent, or Firm* — Honigman LLP; Grant Griffith

(57) ABSTRACT

A method of operating a sublimating device includes providing heat to a cavity of the sublimating device by increasing (i) a temperature of a heater to a predetermined target temperature and (ii) a temperature of a base heater to a predetermined standby temperature. The method further includes determining a difference between the predetermined target temperature and a reduced temperature of the heater. The method also includes determining whether a workpiece is arranged in the cavity based on the difference between the predetermined target temperature and a reduced temperature.

9 Claims, 23 Drawing Sheets

(56) References Cited

U.S. PATENT DOCUMENTS

| | | | |
|---|---|---|---|
| 5,876,547 | A | 3/1999 | Kiesow et al. |
| 5,944,931 | A | 8/1999 | Cranford |
| 6,146,576 | A | 11/2000 | Blackmore |
| 6,186,207 | B1 | 2/2001 | Berghauser et al. |
| 6,230,774 | B1 | 5/2001 | Ward |
| 6,264,783 | B1 | 7/2001 | Oez et al. |
| 6,743,109 | B2 | 6/2004 | Kammerer, Jr. et al. |
| 11,407,245 | B1 * | 8/2022 | Dalton ................ B41F 16/0086 |
| 2007/0214974 | A1 | 9/2007 | Goss et al. |
| 2017/0144466 | A1 | 5/2017 | Anping et al. |
| 2022/0266618 | A1 * | 8/2022 | Barney ................. B41F 17/006 |

FOREIGN PATENT DOCUMENTS

| | | | | |
|---|---|---|---|---|
| CN | 205167838 | U | 4/2016 | |
| CN | 211138510 | U | 7/2020 | |
| WO | WO-2020247368 | A1 * | 12/2020 | ............. B32B 27/36 |

OTHER PUBLICATIONS

USPTO, Office Action relating to U.S. Appl. No. 17/177,965, dated Nov. 16, 2021.

International Search Report and Written Opinion, relating to Application No. PCT/US2022/016374, dated Jul. 12, 2022.

* cited by examiner

SUBLIMATION SYSTEMS AND RELATED METHODS

TECHNICAL FIELD

The present disclosure relates generally to ink sublimation systems, methods, and devices. In particular, the present invention relates heat press systems, methods, and devices configured for ink sublimation.

BACKGROUND

This section provides background information related to the present disclosure and is not necessarily prior art.

Sublimation methods may include transferring infusible ink from a sheet to a surface of a workpiece (e.g., a mug) via heat and pressure by a sublimation device. The sublimation process is responsive to temperature, pressure, and duration such that variations in temperature, pressure, or time applied to the transfer sheet against the surface of the workpiece results in variations in ink transfer. For example, uneven heat distribution to the surface of the workpiece during sublimation may result in cooler surface portions, which causes less ink to transfer to the workpiece at those portions, which results in faded or dimmed portions of the transferred artwork on the surface of the workpiece.

An even distribution of heat onto the surface of a workpiece from the sublimation device may be difficult when, for example, differently sized workpieces having different geometries are interfaced with the sublimation device. Furthermore, the sublimation device may be subjected to a variety of ambient temperature conditions. Because of these difficulties, conventional sublimation devices result in uneven and inconsistent transfers of designs onto workpieces such that unsightly fading and dimming of the transferred designs appear on the workpiece.

Accordingly, there are a number of disadvantages in the art that can be addressed.

SUMMARY

This section provides a general summary of the disclosure, and is not a comprehensive disclosure of its full scope or all of its features.

Embodiments of the present disclosure relate generally to ink sublimation systems, methods, and apparatus. In particular, the present invention relates to mug press system, apparatus, and methods of use. For example, in one embodiment of the present disclosure, a method of sublimating artwork onto a mug includes: providing a mug press, comprising: an indicator; a receptacle; and a heater; indicating with the indicator when a target temperature of the heater has been reached; inserting a mug at least partially into the receptacle; and alerting with the indicator when sublimation of the mug is complete.

In one embodiment of the present disclosure, a method of sublimating artwork onto two or more mugs includes: providing a mug press, comprising an indicator, a receptacle, and a heater; inserting a first mug at least partially into the receptacle; alerting with the indicator when sublimation of the mug is complete; removing the first mug; and sublimating artwork onto a second mug using a method consisting of the same steps that were used to sublimate the first mug, wherein a diameter of the first mug is different than a diameter of the second mug.

In one embodiment of the present disclosure, a method of sublimating a mug in a mug press includes providing a mug press, comprising a receptacle, a heater configured to heat vertical sidewalls of a mug when the mug is clamped at least partially into the receptacle; and a base heater configured to heat the bottom of the mug; increasing a temperature of the base heater to a standby temperature; increasing a temperature of the heater to a first target temperature; detecting when the mug is clamped into the receptacle; and after the mug is detected, increasing the temperature of the base heater to a second target temperature, wherein the standby temperature is less than the second target temperature of the base heater.

One aspect of the disclosure provides a method of operating a sublimating device. The method includes providing heat to a cavity of the sublimating device by increasing: a temperature of a heater to a predetermined target temperature; and a temperature of a base heater to a predetermined standby temperature. The method further includes: determining a difference between the predetermined target temperature and a reduced temperature of the heater; and determining whether a workpiece is arranged in the cavity based on the difference between the predetermined target temperature and a reduced temperature.

Implementations of the disclosure may include one or more of the following optional features. In some implementations, the method includes sublimating infusible sublimation ink onto an outer side surface of the workpiece. In other implementations, the method may further include applying a transfer sheet including the infusible sublimation ink adjacent the outer side surface of the workpiece. In yet other implementations, the method may also include removing the workpiece from the cavity.

In some examples, prior to the removing the workpiece from the cavity, the method further includes applying a transfer sheet including the infusible sublimation ink adjacent the outer side surface of the workpiece. After removing the workpiece from the cavity, the method further includes: removing the transfer sheet from the outer side surface of the workpiece; and revealing that the infusible sublimation ink has been sublimated to the outer side surface of the workpiece.

In other examples, prior to providing the heat to the cavity, the method further comprises powering-on the sublimating device for providing the heat to the cavity. Prior to removing the workpiece from the cavity, the method further includes powering-off the sublimating device.

In some instances, the method further includes: determining that the workpiece is not arranged in the cavity based on the difference between the predetermined target temperature and the reduced temperature; and automatically powering-off the sublimating device based on determining that the workpiece is not arranged in the cavity. In other instances, the method further includes: automatically increasing the reduced temperature of the heater to the predetermined target temperature; and automatically increasing the predetermined standby temperature of the base heater to a predetermined target temperature of the base heater.

Another aspect of the disclosure provides a method of operating a sublimating device having an inner surface defining a cavity. The method may include receiving a first workpiece at least partially in the cavity, the first workpiece including a first outer side surface defining a first diameter; engaging the first outer side surface with the inner surface; receiving a second workpiece at least partially in the cavity, the second workpiece including a second outer side surface defining a second diameter different than the first diameter; and engaging the second outer side surface with the inner surface.

Implementations of the disclosure may include one or more of the following optional features. In some implementations, the method further includes automatically applying a radially-inwardly-directed pressure and heat from a heater of the sublimating device to the first outer side surface. The step of receiving the first workpiece at least partially in the cavity further includes arranging a lower end surface of the first workpiece adjacent a base heater that at least partially forms the cavity. The method then further comprises automatically applying: radially-inwardly-directed heat from a heater of the sublimating device to the first outer side surface; and axially-upwardly-directed heat from the heater to the lower end surface.

In other examples, the method further includes moving a workpiece engagement actuator of the sublimating device from an actuated orientation to a de-actuated orientation to disengaged the inner surface from the first outer side surface. In further examples, the method includes removing the first workpiece from the cavity. In yet other examples, the method includes sublimating a design on the first outer side surface.

In some instances, the method further includes arranging a transfer sheet including an infusible sublimation ink opposite the first outer side surface. In other instances, the method further includes forming a flange-receiving gap in the sublimating device. In yet other instances, the method also includes arranging a flange portion of the first workpiece within the flange-receiving gap such that the flange portion extends radially from the cavity.

In some examples, the method may also include engaging the flange portion with a workpiece-engaging device of the sublimating device. In other examples, the method includes engaging the first outer side surface with the inner surface includes defining a third diameter with the inner surface; and engaging the second outer side surface with the inner surface includes defining a fourth diameter with the inner surface, the fourth diameter being greater than the first diameter.

The details of one or more implementations of the disclosure are set forth in the accompanying drawings and the description below. Other aspects, features, and advantages will be apparent from the description and drawings, and from the claims.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

Additional features and advantages of exemplary aspects of the disclosure will be set forth in the description which follows, and in part will be obvious from the description, or may be learned by the practice of such exemplary aspects. The features and advantages of such aspects may be realized and obtained by means of the instruments and combinations particularly pointed out in the appended claims. These and other features will become more fully apparent from the following description and appended claims or may be learned by the practice of such exemplary aspects as set forth hereinafter.

DESCRIPTION OF DRAWINGS

In order to describe the manner in which the above-recited and other advantages and features of the present disclosure can be obtained, a more particular description of the present disclosure briefly described above will be rendered by reference to specific embodiments thereof which are illustrated in the appended drawings. Understanding that these drawings depict only typical embodiments of the present disclosure and are not therefore to be considered to be limiting of its scope, the present disclosure will be described and explained with additional specificity and detail through the use of the accompanying drawings in which.

Corresponding reference numerals indicate corresponding parts throughout the drawings.

DETAILED DESCRIPTION

The present disclosure relates generally to sublimation systems and devices and methods for using the same. In some instances, a workpiece (e.g., a mug) is removably-secured within a cavity of a sublimation device (e.g., a heat press) described in the present disclosure for transferring a sublimation ink from a sheet to the workpiece. Embodiments of the present disclosure provide technical solutions to a number of technical problems in the art.

In some implementations, exemplary methodologies for utilizing the sublimation device include a minimal number of steps for sublimating one or more workpieces of different sizes in varying ambient conditions. As such, exemplary sublimating devices of the present disclosure are simple to use for novice crafters or artists without training.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

With reference to FIGS. 1-6, implementations of the present disclosure relate generally to a sublimation device 10, which is shown generally at 10, components thereof, and methods of use. As seen at FIGS. 1 and 3-5, the sublimation device 10 is sized for receiving a plurality of differently sized workpieces W of a similar type or species.

Figure 1:
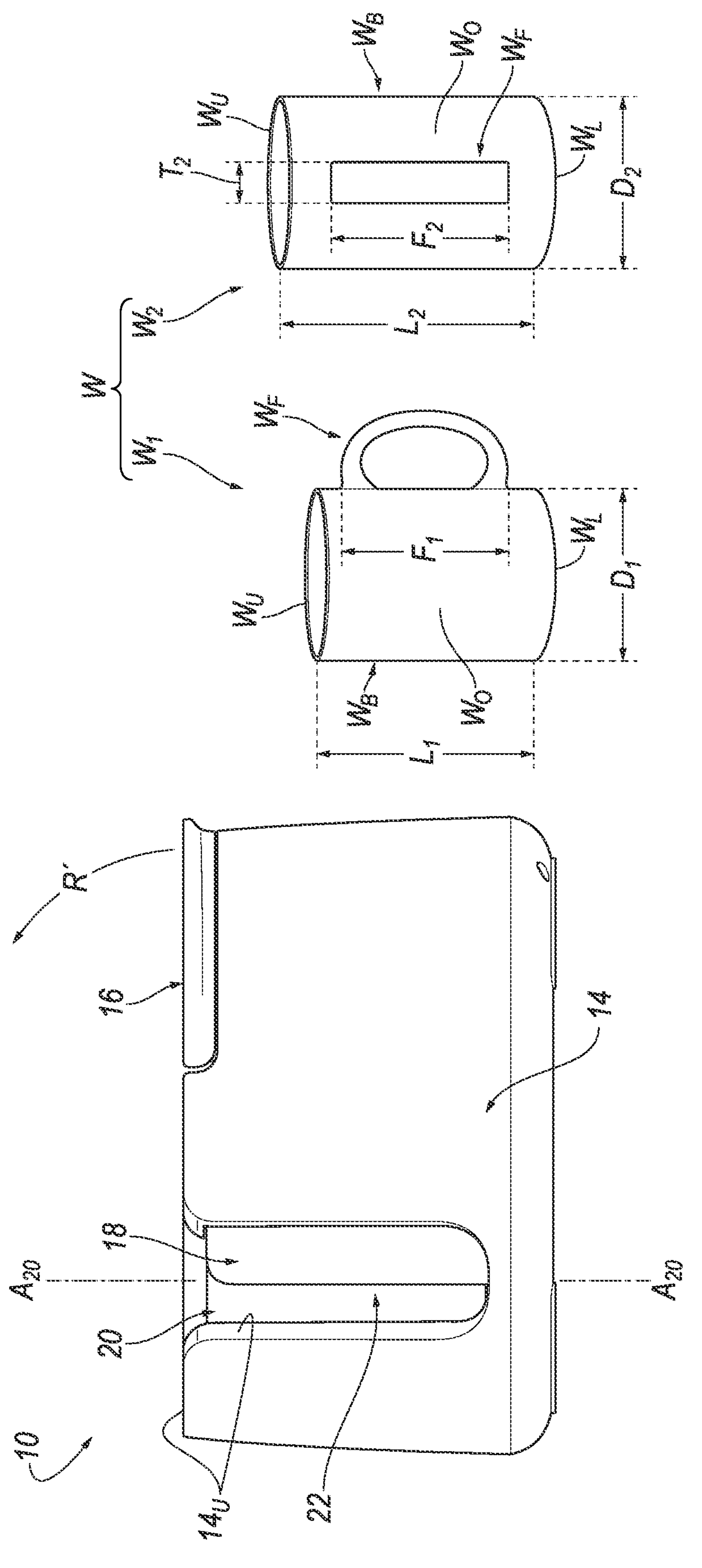
FIG. 1 is a front view of a sublimation device and two exemplary workpieces, according to the principles of the present disclosure.

Referring to FIG. 1, the plurality of differently sized workpieces W are generally represented by a first workpiece $W_1$ and a second workpiece $W_2$. Both of the first workpiece $W_1$ and the second workpiece $W_2$ may be of the same type or same species, and may each include a body portion $W_B$ and a handle or flange portion $W_F$. In some examples, the second workpiece $W_2$ may include, for example, one or both of a larger length $L_2$ and a larger diameter $D_2$ when compared to, for example, a length $L_1$ and a diameter $D_1$ of the first workpiece $W_1$. In other examples, second workpiece $W_2$ may include, for example, one or both of a longer flange length $F_2$ and a thicker flange thickness $T_2$ (see, e.g., FIGS. 1 and 5) when compared to, for example, a flange length $F_1$ and a flange thickness $T_1$ (see, e.g., FIGS. 3-4) of the first workpiece $W_1$. Exemplary diameters $D_1$, $D_2$ of the workpiece $W_1/W_2$ may be between approximately about 81 mm-87 mm.

The plurality of differently sized workpieces W may include any desirable configuration that provides any desirable function. In some instances, the body portion $W_B$ of the plurality of differently sized workpieces W may be shaped to retain, for example, a liquid, solid, or semi-solid. Accordingly, the plurality of differently sized workpieces W may be a vase, bowl, beverage container, or the like. In this regard, while the workpieces W are generally shown and described herein as being mugs, it will be appreciated that the sublimation device 10 may utilize other workpieces W within the scope of the present disclosure. The plurality of differently sized workpieces W may include any desirable material such as, for example, a ceramic material. Although the plurality of differently sized workpieces W are shown and described to include the flange portion $W_F$, the plurality of differently sized workpieces W may be configured to not include the flange portion $W_F$.

Referring to FIGS. 1-6, the exemplary sublimation device 10 may be configured to transfer heat (see, e.g., FIGS. 14 and 15B) to an outer side surface $W_O$ of one or more workpieces $W_1$, $W_2$ of the plurality of differently sized workpieces W for sublimating a design, which may be alternatively referred to as artwork A (see, e.g., FIGS. 13A-13H, 14, and 14') onto the outer side surface $W_O$ of one or more workpieces $W_1$, $W_2$ of the plurality of differently sized workpieces W. In some configurations, the sublimating device 10 may be configured to apply not only heat H, but, also a force or pressure P (see, e.g., FIG. 14A) to a transfer sheet S that includes infusible sublimation ink I that forms the design A. Accordingly, as will be described in the following disclosure at FIGS. 13B-13D, the transfer sheet S may be removably-applied to the outer side surface $W_O$ of one or more workpieces $W_1$, $W_2$ of the plurality of differently sized workpieces W prior to being placed into the sublimation device 10. Once placed within and subsequently activating the sublimation device 10, the infusible sublimation ink I that is arranged adjacent the outer side surface $W_O$ of one or more workpieces $W_1$, $W_2$ of the plurality of differently sized workpieces W is sublimated or infused onto the outer side surface $W_O$ of one or more workpieces $W_1$, $W_2$ of the plurality of differently sized workpieces W.

In some configurations, the sublimation device 10 may be actuated or powered on upon pressing a button 80 (see, e.g., FIGS. 2 and 6) that extends through a passage 12 formed by an outer housing 14. The sublimation device 10 may further include a handle or workpiece engagement actuator (e.g., a handle) that is seen generally at 16. Movement of the workpiece engagement actuator 16 to/from a first orientation (see, e.g., FIG. 3) and a second orientation (see, e.g., FIGS. 1-2 and 4-6) results in corresponding movement of a workpiece-engaging device (e.g., a clamp), which is seen generally at 18 to/from an disengaged orientation (see, e.g., FIG. 3) and an engaged or engaging orientation (see, e.g., FIGS. 1-2 and 4-6). As seen at FIG. 6, the workpiece engagement actuator 16 may be rotatable (see, e.g. arrow R' at FIGS. 1-2 and 4-5 and arrow R at FIG. 3) about an axis A16-A16; accordingly, the workpiece engagement actuator 16 is configured to be selectively rotated: (1) according to the direction of arrow R' about the axis A16-A16 in a first direction for arranging the workpiece engagement actuator 16 in an up orientation (see, e.g., FIG. 3) relative to the outer housing 14; and (2) according to the direction of the arrow R about the axis A16-A16 in a second direction (that is opposite the first direction R') for arranging the workpiece engagement actuator 16 in a down orientation (see, e.g., FIGS. 1-2 and 4-6) relative to the outer housing 14.

Figure 7:
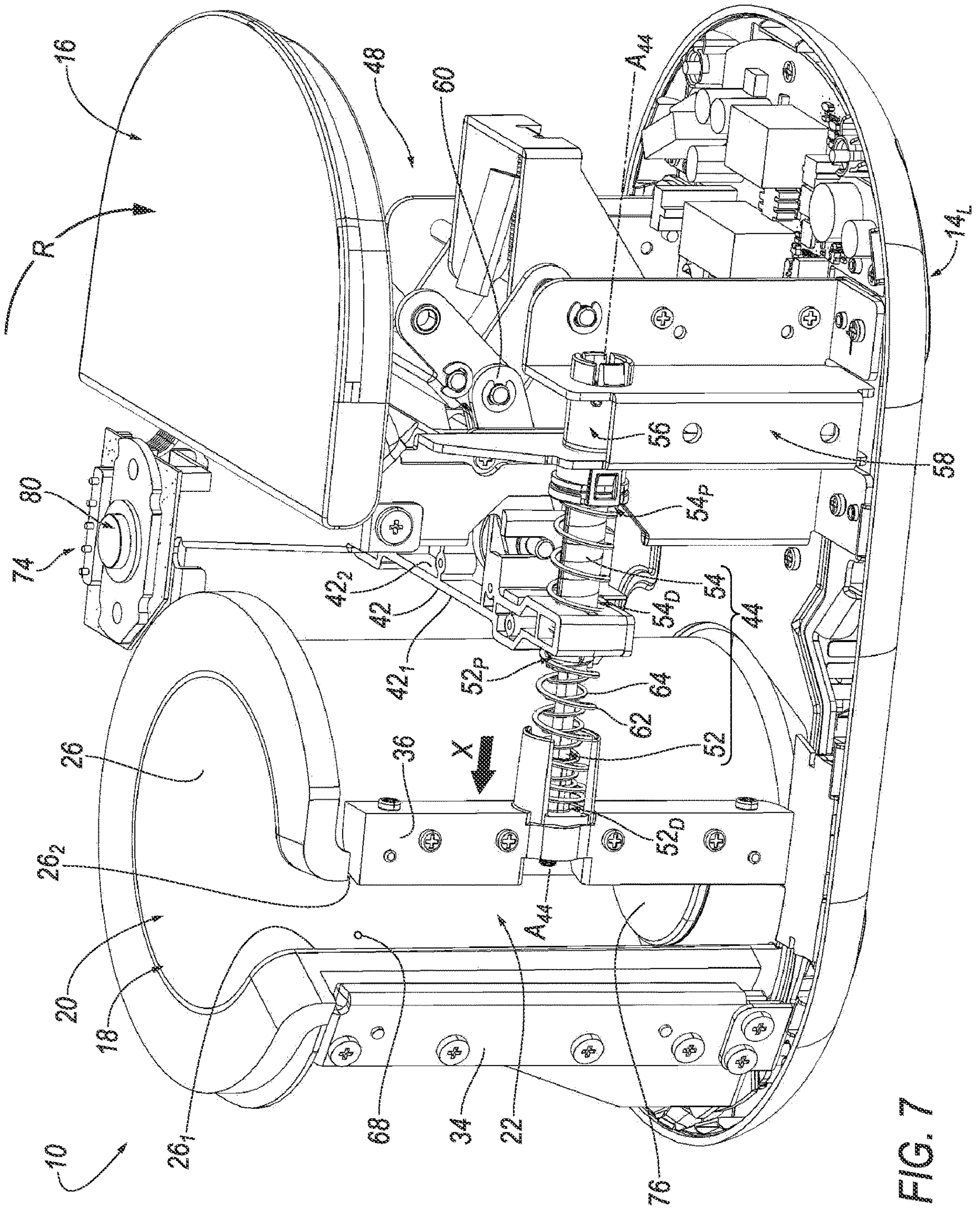
FIG. 7 is a top perspective view of the sublimation device of FIGS. 1-2 with an outer housing removed, according to the present disclosure.

With reference to FIG. 7, the workpiece engagement actuator 16 may be connected to the workpiece-engaging device 18 by way of an intervening connecting structure or linkage assembly 48 in such a way that: (1) the raising of the workpiece engagement actuator 16 to the up orientation disengages, releases, or "opens" the workpiece-engaging device 18; and (2) the lowering of the workpiece engagement actuator 16 engages or "closes" the workpiece-engaging device 18. Alternatively, in some configurations, the workpiece-engaging device 18 may be "opened" by pushing the workpiece engagement actuator 16 downward, and, in an opposite manner, a lifting motion of the workpiece engagement actuator 16 in an upwardly direction may cause the workpiece-engaging device 18 to be "closed".

Figure 2:
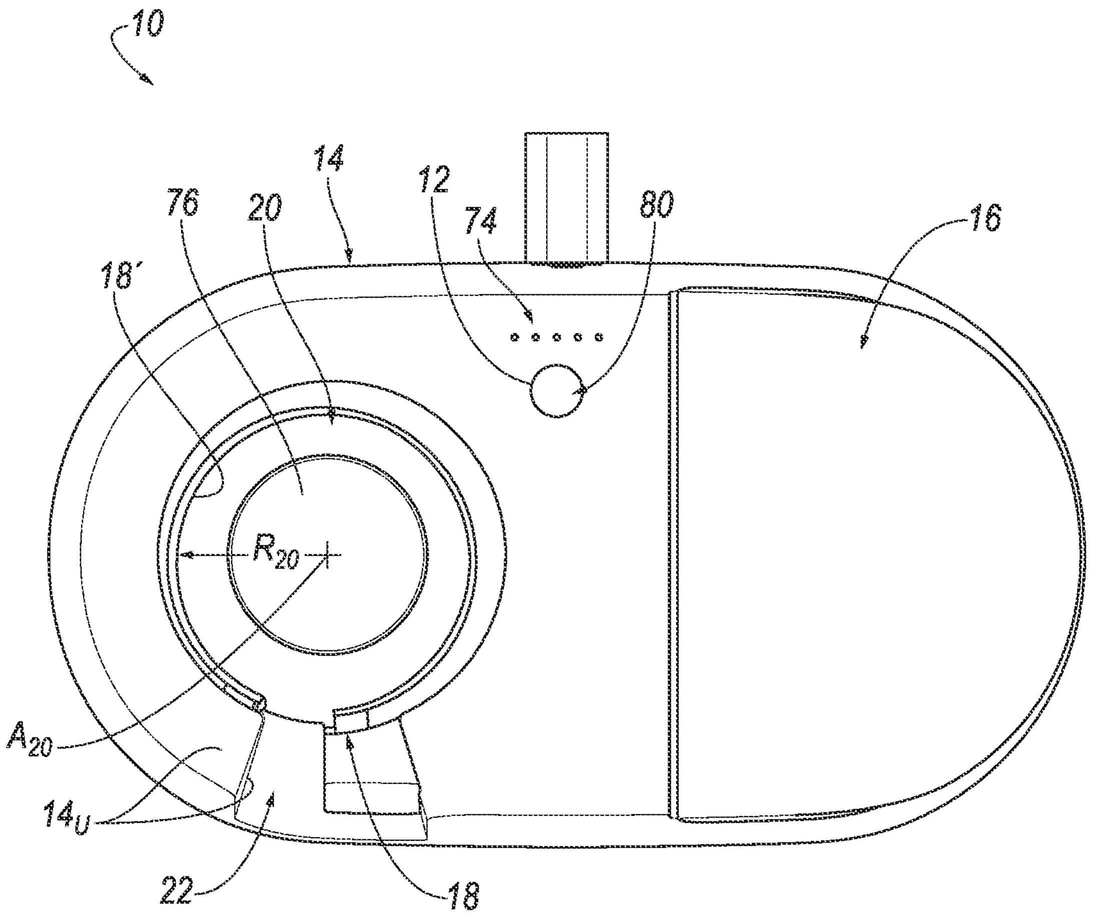
FIG. 2 is a top view of the sublimation device of FIG. 1.

With reference to FIGS. 1 and 2, in some implementations, the workpiece-engaging device 18 includes a wall 18' formed generally into a cylindrical configuration defining a substantially cylindrical cavity 20. As the workpiece engagement actuator 16 is moved up R' or down R during use, the material (e.g., wall 18') of workpiece-engaging device 18 is manipulated such that the circumference of the wall 18' defining the cavity 20 expands (e.g., radially) or contracts (e.g., radially). For example, radius Rao may be maximized when the workpiece engagement actuator 16 is moved up R' or minimized when the workpiece engagement actuator 16 is moved down R. The radius $R_{20}$ that is generally defined by the cavity 20 may be referenced from a central axis $A_{20}$-$A_{20}$ (see, e.g., FIGS. 1 and 3), extending through an axial center of the cavity 20. When arranged in the engaged or "closed" orientation, the workpiece-engaging device 18 applies a circumferential force or pressure P in a radial direction toward the central axis $A_{20}$-$A_{20}$ against the outer side surface $W_O$ of one of the workpieces $W_1$, $W_2$ of the plurality of differently sized workpieces W that may be placed within the cavity 20.

Figure 3:
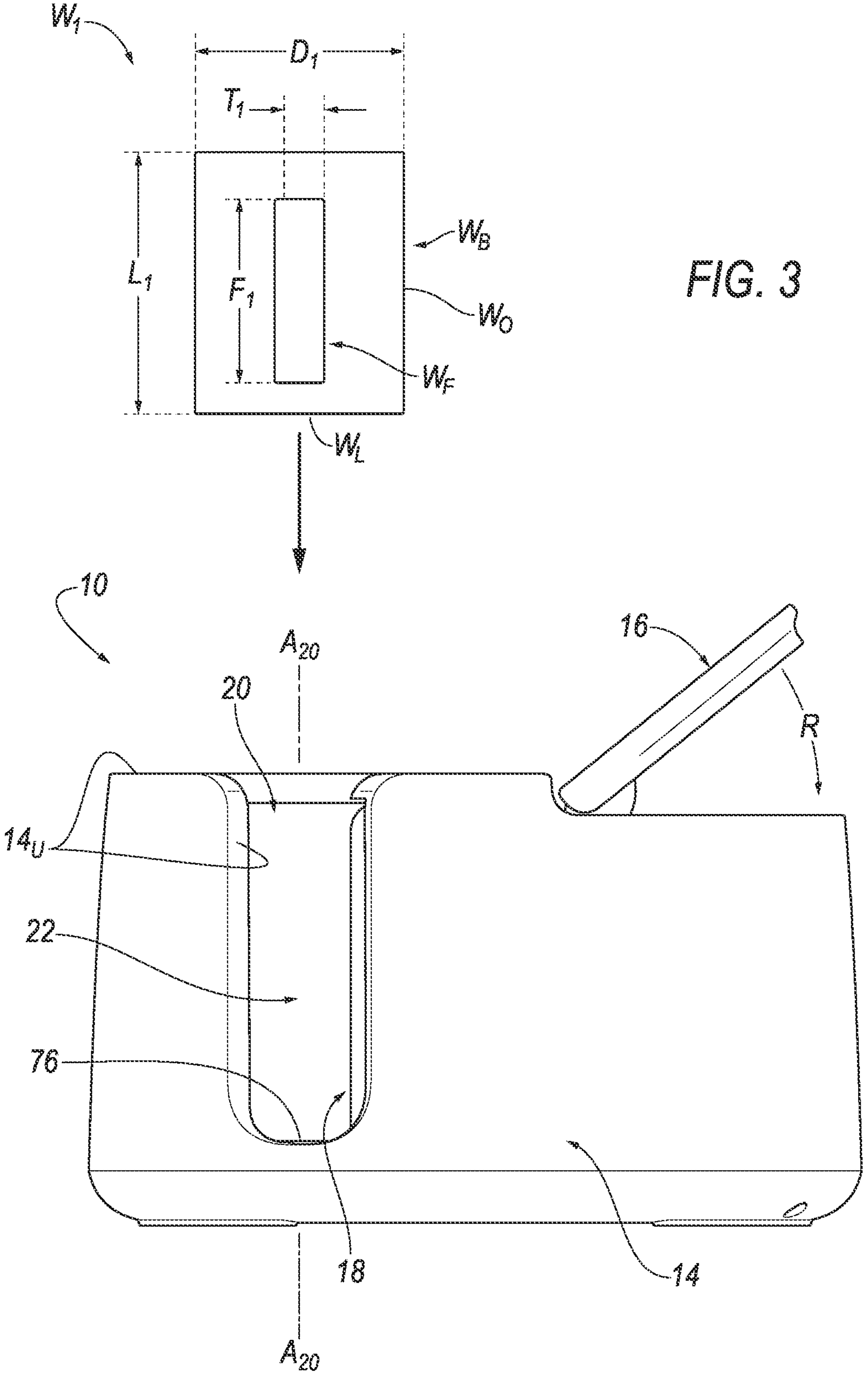
FIG. 3 is a front view of the sublimation device of FIG. 1 showing the first workpiece arranged proximate a cavity of the sublimation device that is sized to receive either of, for example, the first workpiece or the second workpiece while a workpiece-engaging device of the sublimation device is arranged in a disengaged orientation, according to the present disclosure.

Also, in some implementations, the workpiece-engaging device 18 may not entirely form a cylindrical configuration, providing an axial gap 22 that also extends radially though the outer housing 14. As seen at FIGS. 1 and 3, a portion of an upper trim surface 14*u* that may trim the outer housing 14 forms a substantially U-shape (see, e.g., FIGS. 1 and 3), and, a portion of the workpiece-engaging device 18 may collectively form the gap 22. During use, the gap 22 may provide a space through which, for example, the flange portion $W_F$ of one of the workpieces $W_1$, $W_2$ of the plurality of differently sized workpieces W may protrude after one of the workpieces $W_1$, $W_2$ of the plurality of differently sized workpieces W is axially placed into cavity 20 along the central axis $A_{20}$-$A_{20}$. As seen at FIG. 3, when the workpiece engagement actuator 16 is arranged in a disengaged, upward position, the workpiece-engaging device 18 may be said to be arranged in an "open" orientation such that one of the workpieces $W_1$, $W_2$ of the plurality of differently sized workpieces W may be inserted into the cavity 20. Furthermore, as seen at FIG. 3, in some instances, prior to axially inserting one of the workpieces $W_1$, $W_2$ of the plurality of differently sized workpieces W into the cavity 20, the flange portion $W_F$ of one of the workpieces $W_1$, $W_2$ of the plurality of differently sized workpieces W may be axially aligned with the gap 22.

With reference to FIG. 3, after one of the workpieces $W_1$, $W_2$ of the plurality of differently sized workpieces W is arranged within the cavity 20, the workpiece engagement actuator 16 may be rotated according to the direction of the arrow R for subsequent arrangement in the "down" orientation or "closed" position so that workpiece-engaging device 18 "closes" for circumferentially engaging and compressing one of the workpieces $W_1$, $W_2$ of the plurality of differently sized workpieces W within the cavity 20. As noted above, the circumference of the cavity 20 reduces (e.g., the radius $R_{20}$ that is generally defined by the cavity 20 is reduced) when the workpiece-engaging device 18 is arranged in the engaged orientation or "closed" position so that when one of the workpieces $W_1$, $W_2$ of the plurality of differently sized workpieces W is first placed within the cavity 20, the material of the workpiece-engaging device 18 forming the cylindrical wall that forms the cavity 20 presses against the outer side surface $W_O$ of one of the workpieces $W_1$, $W_2$ of the plurality of differently sized workpieces W.

Figure 4:
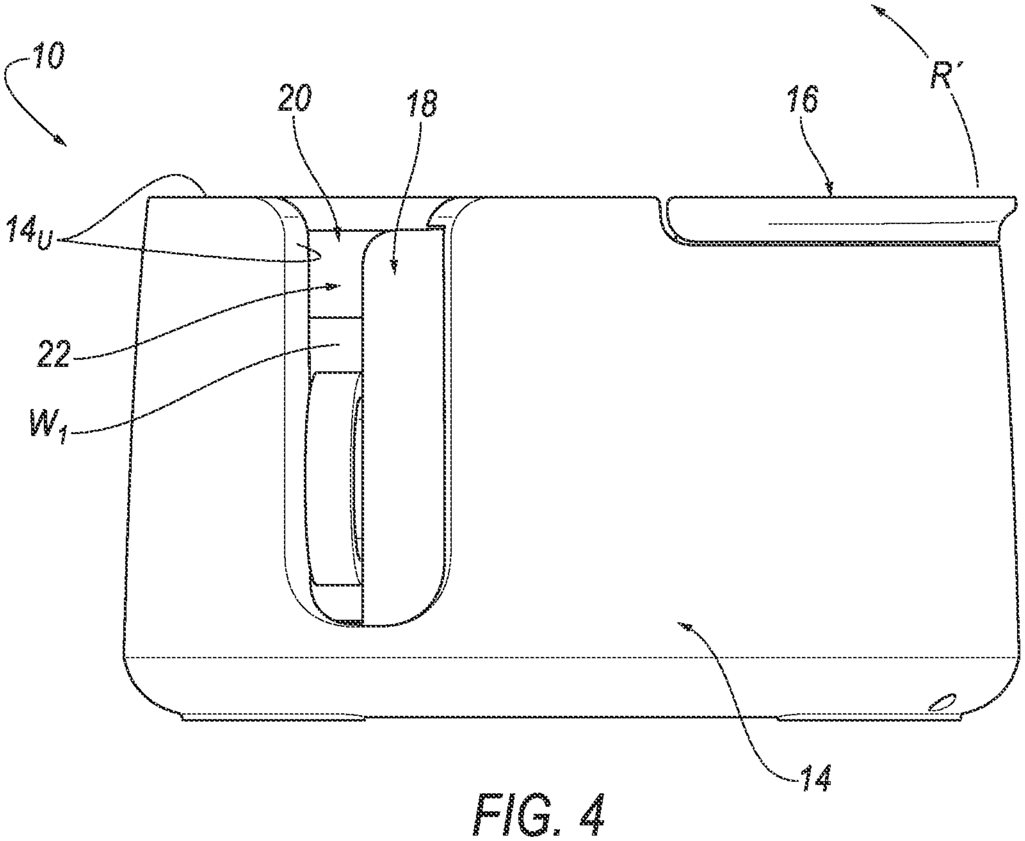
FIG. 4 is another front view of the sublimation device according to FIG. 3 showing the first workpiece arranged within the cavity of the sublimation device while the workpiece-engaging device is arranged in an engaged orientation, according to the present disclosure.
Figure 5:
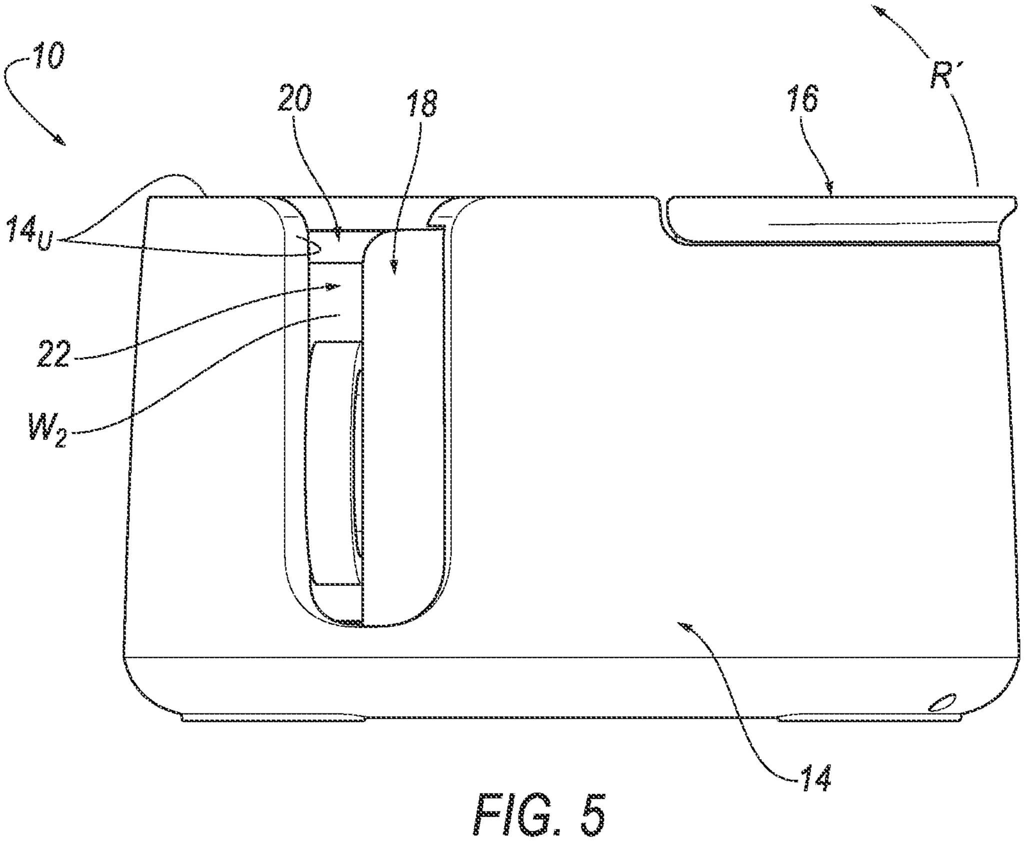
FIG. 5 is another front view of the sublimation device according to FIG. 3 showing the second workpiece arranged within the cavity of the sublimation device while the workpiece-engaging device is arranged in an engaged orientation, according to the present disclosure.
Figure 6:
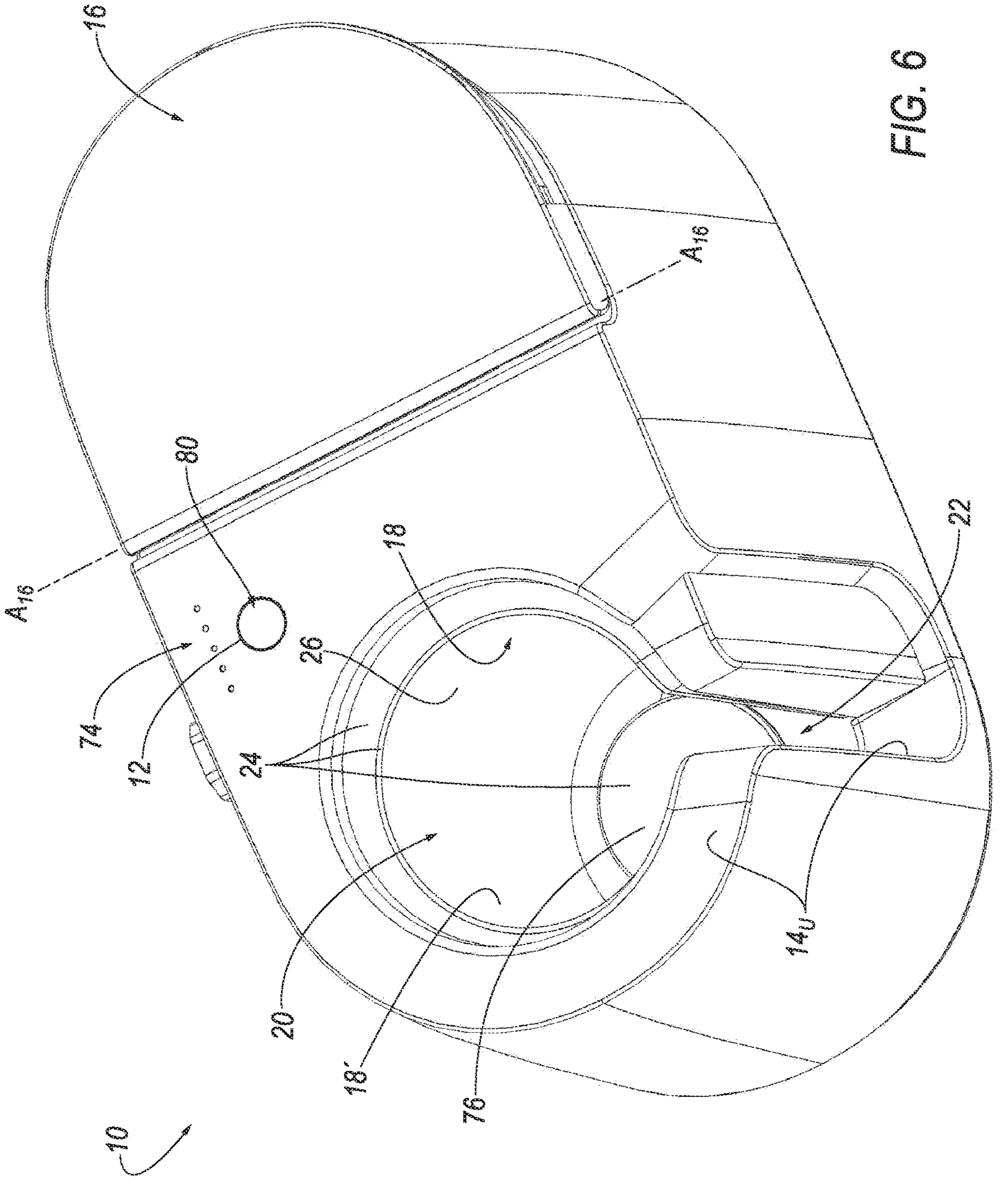
FIG. 6 is a top perspective view of the sublimation device of FIGS. 1-2 showing the workpiece-engaging device arranged in an engaged orientation while a workpiece is not arranged within the cavity of the sublimation device, according to the present disclosure.
Figure 13A:
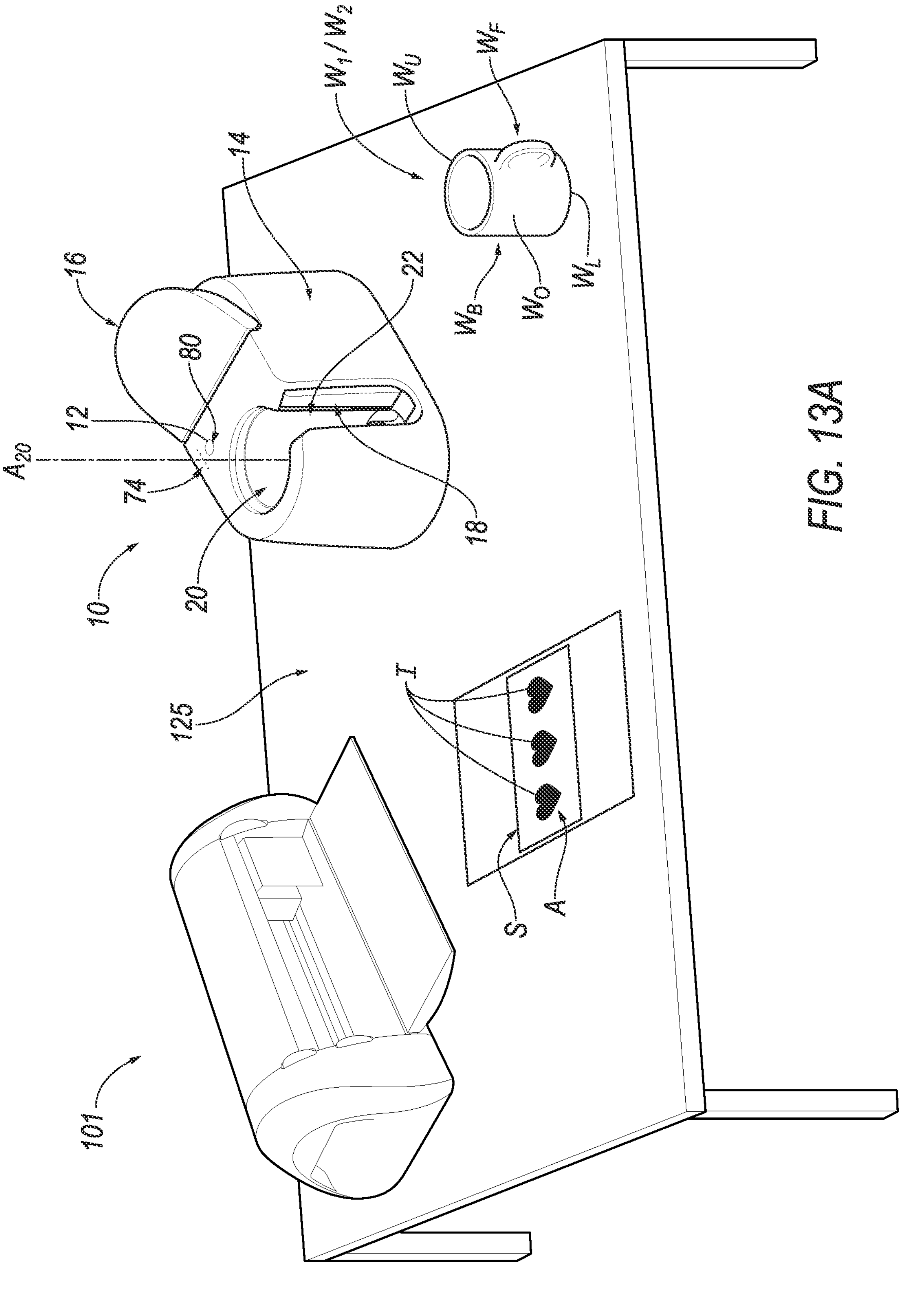
FIGS. 13A-13H illustrate a method for utilizing the sublimation device of FIG. 1, according to the present disclosure.

As seen at FIGS. 4-5, the cavity 20 of the sublimation device 10 is sized for receiving the plurality of differently sized workpieces W that may include, for example, the first workpiece $W_1$ that may be, for example, a 12 oz beverage container and the second workpiece $W_2$ that may be, for example, a 15 oz beverage container. Once one of the workpieces $W_1$, $W_2$ of the plurality of differently sized workpieces W has been placed within the cavity 20 and the workpiece-engaging device 18 has been arranged in the engaged orientation or "closed" position for circumferentially engaging the outer side surface $W_O$ of one of the workpieces $W_1$, $W_2$ of the plurality of differently sized workpieces W for circumferentially applying pressure P in a radially inward direction toward the central axis $A_{20}$-$A_{20}$ of the cavity 20, the sublimation device 10 may be activated for imparting heat H to the outer side surface $W_O$ of one of the workpieces $W_1$, $W_2$ of the plurality of differently sized workpieces W for sublimating the infusible sublimation ink I that forms the design A onto the outer side surface $W_O$ of one of the workpieces $W_1$, $W_2$ of the plurality of differently sized workpieces W. The infusible sublimation ink I that forms the design A may include any number of pictures, artwork, text, or the like, which may be created by a user. In some examples, as seen at FIG. 13A, the user may interface the transfer sheet S within a crafting machine 101 such that the crafting machine 101 may print and/or cut the design A on and/or into the transfer sheet S.

Figure 13B:
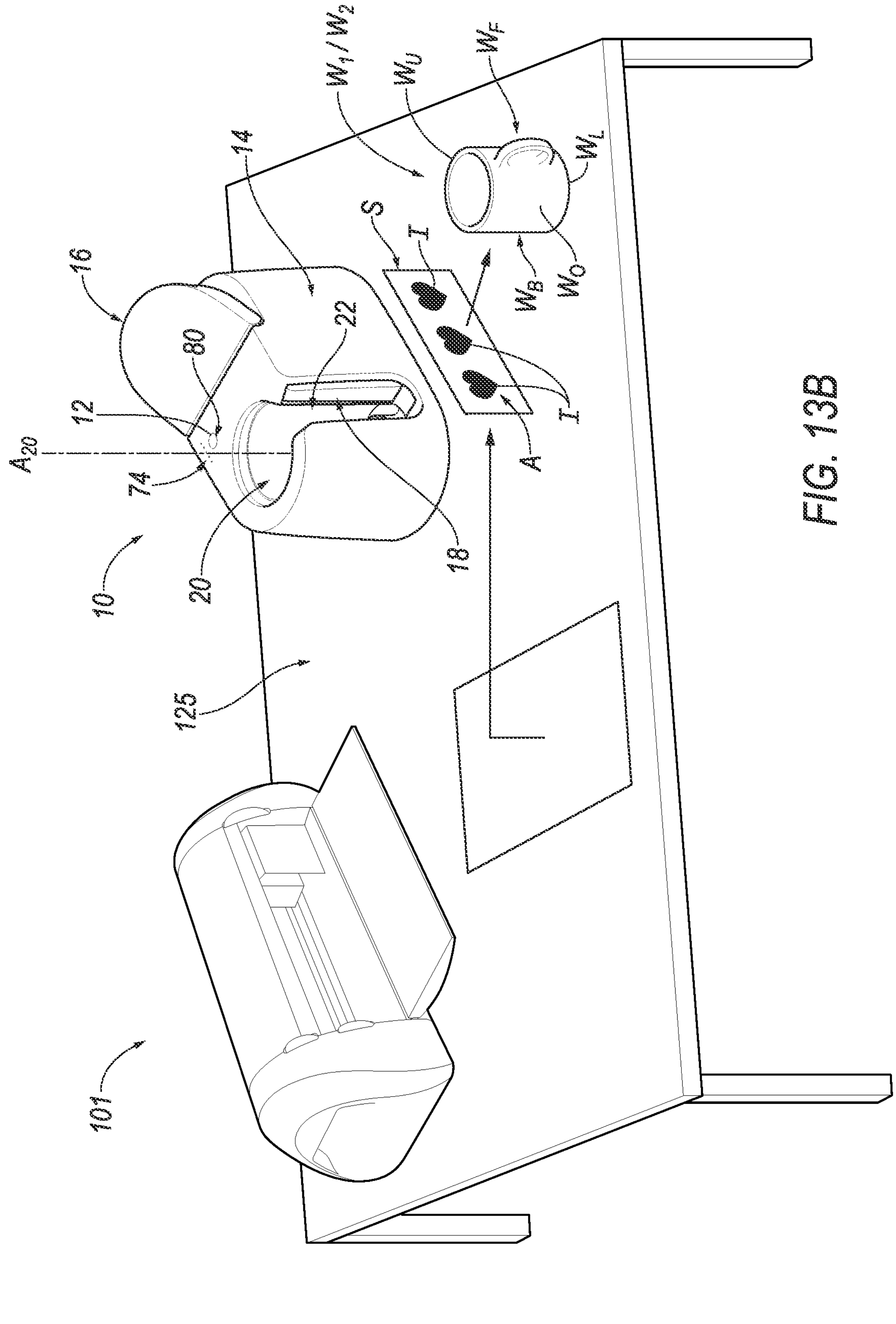
Figure 13C:
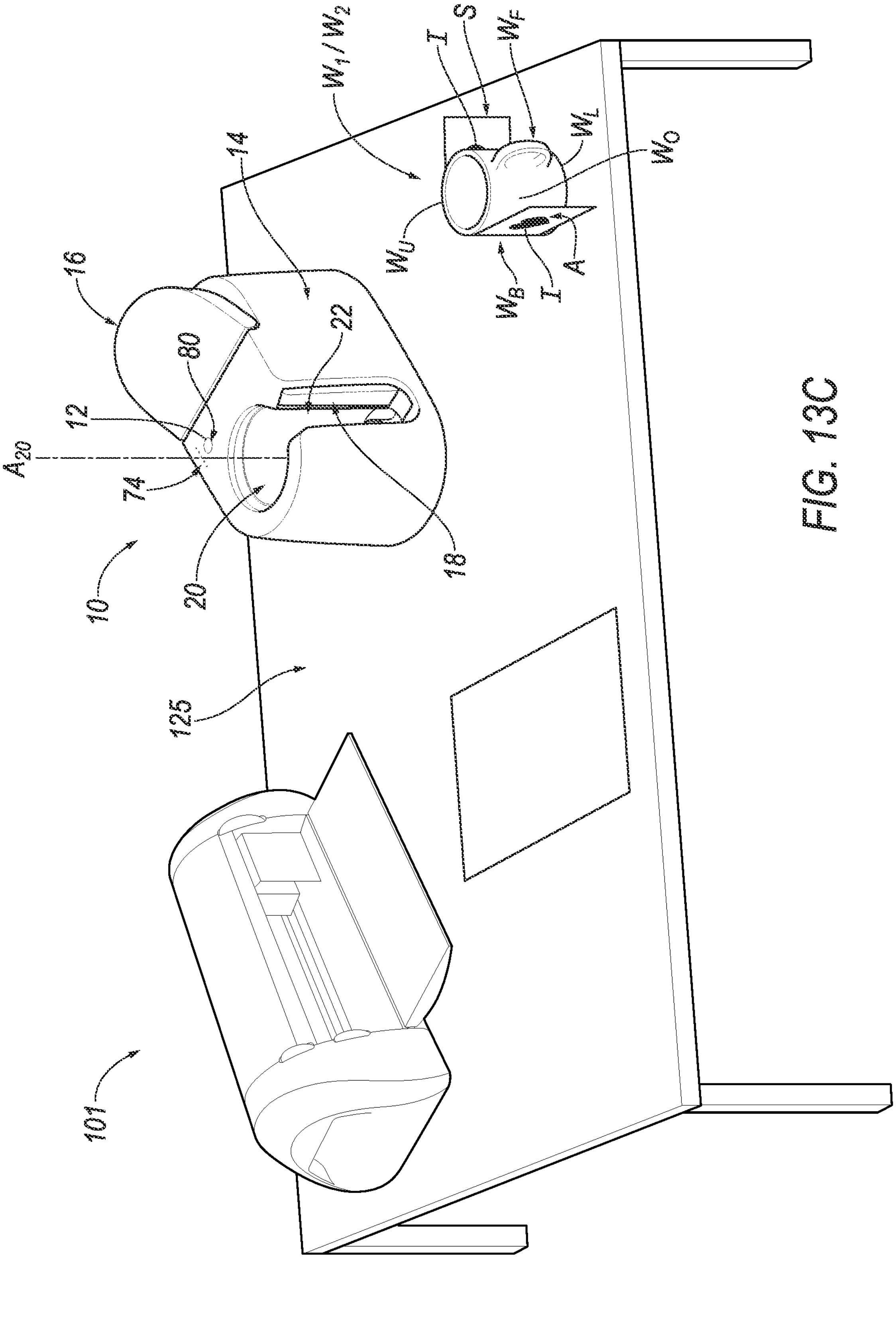
Figure 13D:
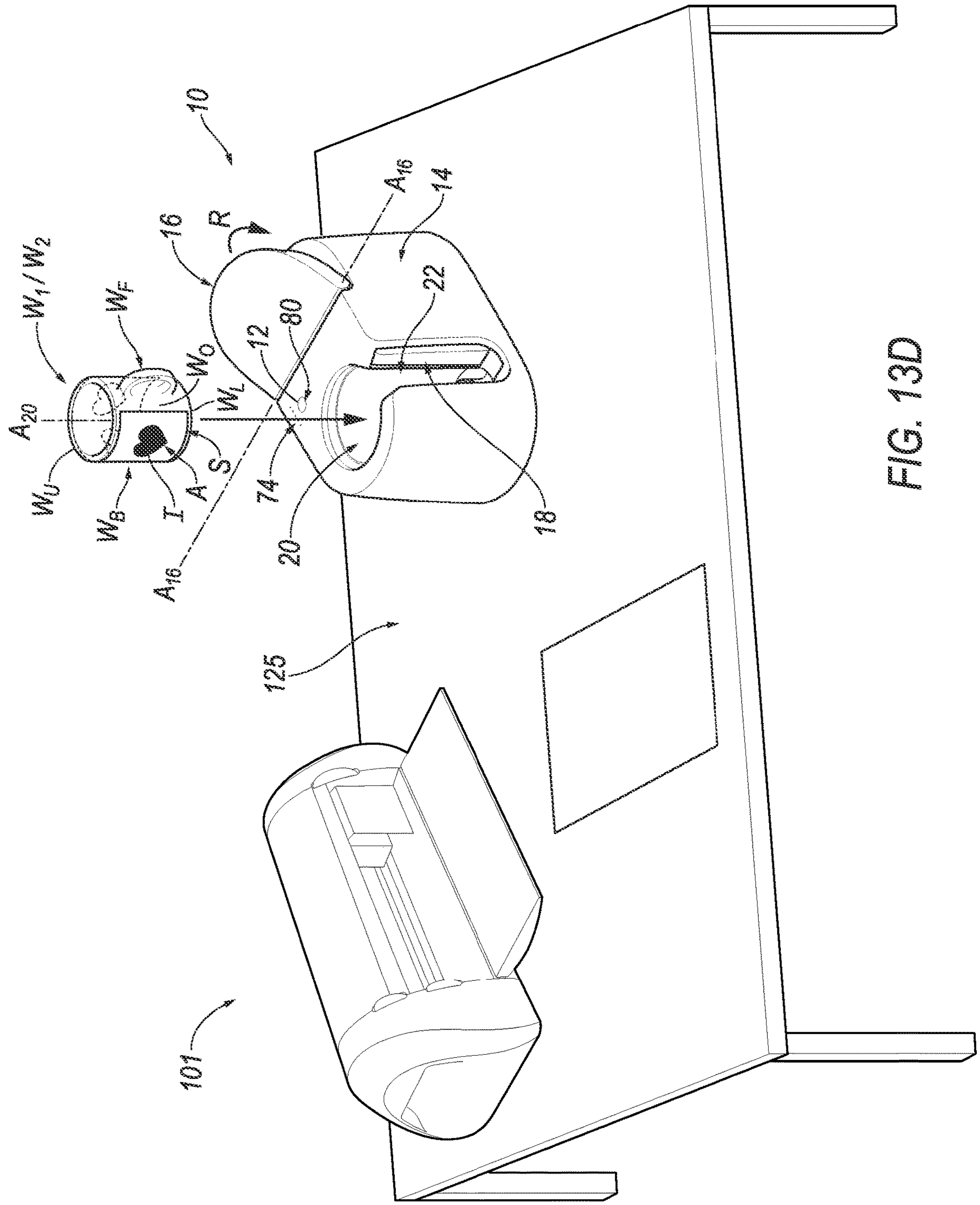
Figure 13E:
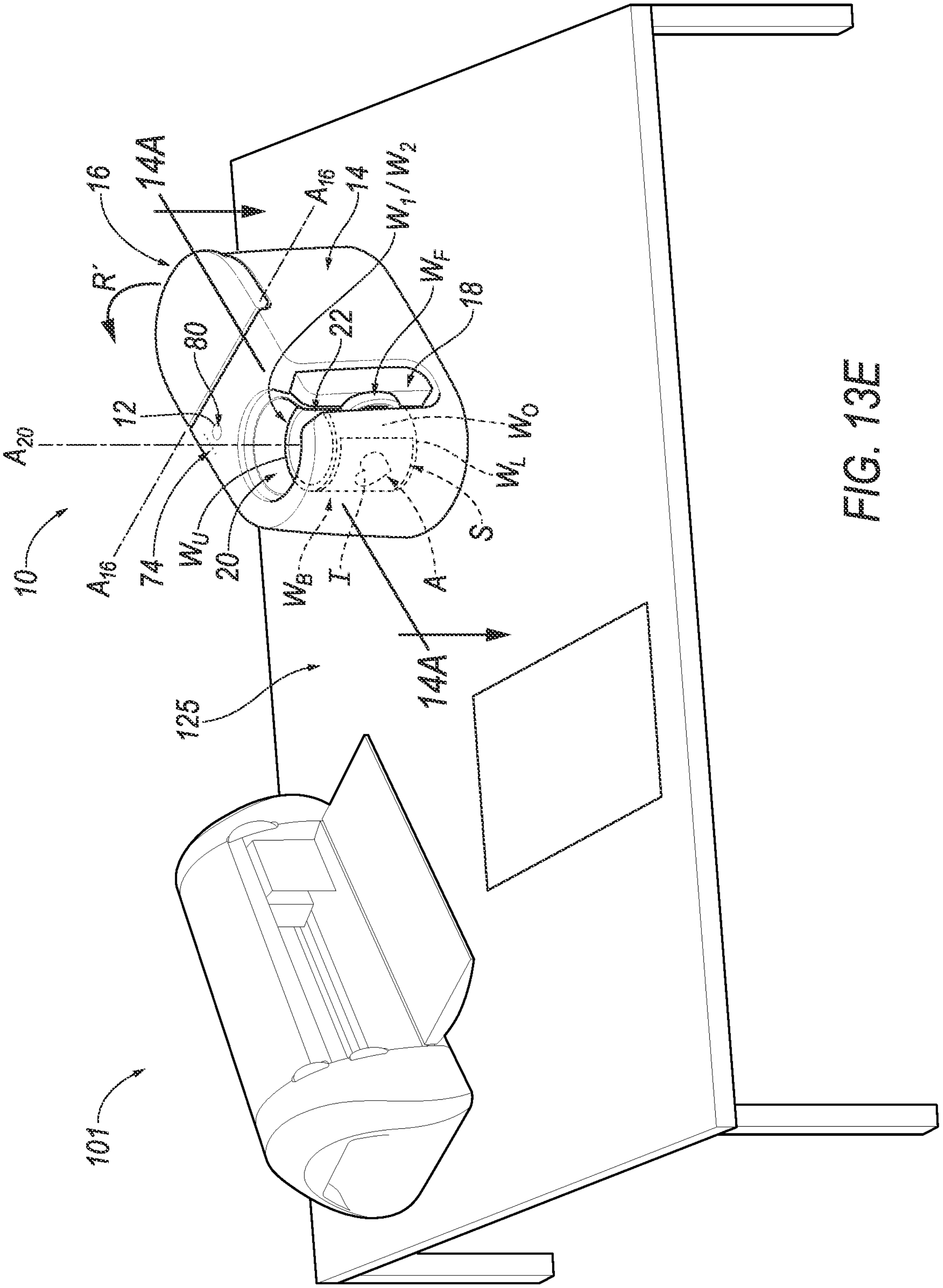

The sublimation of the infusible sublimation ink I that forms the design A onto the outer side surface $W_O$ of one of the workpieces $W_1$, $W_2$ of the plurality of differently sized workpieces W may include the transfer of the infusible sublimation ink I from the transfer sheet S onto or into the outer side surface $W_O$ of one of the workpieces $W_1$, $W_2$ of the plurality of differently sized workpieces W. With reference to FIGS. 13B-13D, before arranging the workpiece-engaging device 18 in a closed orientation around the outer side surface $W_O$ of one of the workpieces $W_1$, $W_2$ of the plurality of differently sized workpieces W (as seen at FIG. 13E), the user may place the transfer sheet S containing the infusible sublimation ink I adjacent the outer side surface $W_O$ of one of the workpieces $W_1$, $W_2$ of the plurality of differently sized workpieces W. Accordingly, when one of the workpieces $W_1$, $W_2$ of the plurality of differently sized workpieces W including the transfer sheet S is arranged within the cavity 20, the transfer sheet S is circumferentially arranged between an inner cylindrical wall (see, e.g., reference numeral 18' at FIGS. 2 and 6) of the workpiece-engaging device 18 and the outer side surface $W_O$ of one of the workpieces $W_1$, $W_2$ of the plurality of differently sized workpieces W. In this way, when the inner cylindrical wall 18' of the workpiece-engaging device 18 circumferentially applies a pressure P in a radially inwardly direction toward the outer side surface $W_O$ of one of the workpieces $W_1$, $W_2$ of the plurality of differently sized workpieces W, the transfer sheet S is pressed against the outer side surface $W_O$ of one of the workpieces $W_1$, $W_2$ of the plurality of differently sized workpieces W. Thus situated, heat H can then be substantially circumferentially applied: (1) from the inner cylindrical wall 18' of the workpiece-engaging device 18; (2) through a thickness of the transfer sheet S containing sublimation ink pressed against the outer side surface $W_O$ of one of the workpieces $W_1$, $W_2$ of the plurality of differently sized workpieces W; and (3) onto or into the outer side surface $W_O$ of one of the workpieces $W_1$, $W_2$ of the plurality of differently sized workpieces W.

In some implementations, a predetermined amount and/or a predetermined duration of pressure P and heat H applied to the outer side surface $W_O$ of one of the workpieces $W_1$, $W_2$ of the plurality of differently sized workpieces W during the sublimation process achieves sufficient transfer of the infusible sublimation ink I from transfer sheet S to the outer side surface $W_O$ of one of the workpieces $W_1$, $W_2$ of the plurality of differently sized workpieces W. Variations in one or more of temperature associated with the H, the pressure P, or time between different portions of the outer side surface $W_O$ of one of the workpieces $W_1$, $W_2$ of the plurality of differently sized workpieces W may result in inconsistent transfers of infusible sublimation ink I, thereby causing faded, dimmed, or otherwise insufficient transfer of the infusible sublimation ink I to certain portions of the outer side surface $W_O$ of one of the workpieces $W_1$, $W_2$ of the plurality of differently sized workpieces W. Faded and dimmed portions of the infusible sublimation ink I to certain portions of the outer side surface $W_O$ of one of the workpieces $W_1$, $W_2$ of the plurality of differently sized workpieces W may appear, for example, where lower or insufficient temperatures associated with the applied heat H occurs on the outer side surface $W_O$ of one of the workpieces $W_1$, $W_2$ of the plurality of differently sized workpieces W. Accordingly, the sublimation device 10 is configured to provide consistent transfer of the heat H with sufficient pressure P around the entire outer side surface $W_O$ of the workpieces $W_1$, $W_2$ of the plurality of differently sized workpieces W where the infusible sublimation ink I is to be sublimated thereon.

In some instances, the inner cylindrical wall 18' of the workpiece-engaging device 18 or one or more other components of the sublimation device 10 proximate the inner cylindrical wall 18' of the workpiece-engaging device 18 is configured to maintain a temperature of approximately above about 185° C. (see, e.g., the predetermined target temperature $T_{26\text{-}TAR}$ of the heater 26 at FIG. 10) in order to sublimate the infusible sublimation ink I on the transfer sheet S to the outer side surface $W_O$ of one of the workpieces $W_1$, $W_2$ of the plurality of differently sized workpieces W. In other configurations, the inner cylindrical wall 18' of the workpiece-engaging device 18 or one or more other components of the sublimation device 10 proximate the inner cylindrical wall 18' of the workpiece-engaging device 18 is configured to maintain a temperature of approximately above about 190° C.±5° C. in order to sublimate the infusible sublimation ink I on the transfer sheet S to the outer side surface $W_O$ of one of the workpieces $W_1$, $W_2$ of the plurality of differently sized workpieces W. In some implementations, the inner cylindrical wall 18' of the workpiece-engaging device 18 or one or more other components of the sublimation device 10 proximate the inner cylindrical wall 18' of the workpiece-engaging device 18 is configured to maintain a temperature of approximately about 193° C. for approximately about 40 seconds.

As will be described in the following disclosure, a base heater 76 (see, e.g., FIG. 6) may be configured to maintain a temperature of approximately 210° C. (+/−10%) (see, e.g., the predetermined target temperature $T_{76\text{-}TAR}$ of the base heater 76 at FIG. 10) in order to mitigate a reduction of the temperature of the outer side surface $W_O$ of one of the workpieces $W_1$, $W_2$ of the plurality of differently sized workpieces W proximate a lower end surface $W_L$ (see, e.g., FIG. 1) of one of the workpieces $W_1$, $W_2$ that is opposite an upper end surface $W_U$ (see, e.g., FIG. 1) of the one of the workpieces $W_1$, $W_2$. Accordingly, by heating the lower end surface $W_L$ of one of the workpieces $W_1$, $W_2$ of the plurality of differently sized workpieces W, the sublimation device 10 assists in eliminating a heat sink that would otherwise result in a temperature drop near an edge (e.g., where the outer side surface $W_O$ meets the lower end surface $W_L$) of one of the workpieces $W_1$, $W_2$.

In some instances, the sublimation device 10 may impart heat H to the outer side surface $W_O$ of one of the workpieces $W_1$, $W_2$ of the plurality of differently sized workpieces W for about 4-to-5 minutes. Furthermore, in some configurations, portions of a heater 26 (see, e.g., FIG. 6) that may be arranged proximate to, or form the inner cylindrical wall 18' of, the workpiece-engaging device 18 may include a plurality of heating zones (not shown) that will heat different portions (e.g., a left side zone, a right side zone, and a center zone) of the inner cylindrical wall 18' of the workpiece-engaging device 18 to different temperatures. For example, both of a left side zone and a right side zone of the inner cylindrical wall 18' of the workpiece-engaging device 18 may be heated H to a higher temperature (e.g., by about 10-20° C., such as, for example, to a temperature of approximately about 200-210° C.) in comparison to a center zone of the of the inner cylindrical wall 18' of the workpiece-engaging device 18. Accordingly, by heating the left side zone and the right side zone of the of the inner cylindrical wall 18' of the workpiece-engaging device 18 to a higher temperature than the center zone of the of the inner cylindrical wall 18' of the workpiece-engaging device 18, a successful sublimation of the infusible sublimation ink I arranged near, for example, the flange portion $W_F$ of one of the workpieces $W_1$, $W_2$ of the plurality of differently sized workpieces W may occur (i.e., otherwise, the flange portion $W_F$ of one of the workpieces $W_1$, $W_2$ of the plurality of differently sized workpieces W may result in a heat sink, and, therefore, a loss of heat H, which may result in a faded and dimmed portion of the infusible sublimation ink I on the outer side surface $W_O$ of one of the workpieces $W_1$, $W_2$ of the plurality of differently sized workpieces W that is arranged near the flange portion $W_F$.

During sublimation, the transfer of heat H may be affected by either convective or conductive heat losses. Even if, hypothetically, heat H was transferred evenly from the inner cylindrical wall 18' of the workpiece-engaging device 18 to the outer side surface $W_O$ of one of the workpieces $W_1$, $W_2$, certain areas of the outer side surface $W_O$ of one of the workpieces $W_1$, $W_2$ may be cooler than others due to these heat losses, which may affect certain areas of the outer side surface $W_O$ of one of the workpieces $W_1$, $W_2$ more than others. For example, because the cavity 20 is open at a top end thereof, the upper end surface $W_U$ of one of the workpieces $W_1$, $W_2$ of the plurality of differently sized workpieces W may be exposed to airflow or ambient air, and, as a result, is cooled due to convective heat loss; this may also occur at or around the edges of gap 22 (that may be at least partially formed by the upper trim surface 14*u* that may trim the outer housing 14) where the flange portion $W_F$ of one of the workpieces $W_1$, $W_2$ of the plurality of differently sized workpieces W is arranged.

Additionally, one of the workpieces $W_1$, $W_2$ may functionally act as a heat sink to conductively transfer the heat H away from the outer side surface $W_O$ of one of the workpieces $W_1$, $W_2$ of the plurality of differently sized workpieces W to different extents at different areas of the outer side surface $W_O$ of one of the workpieces $W_1$, $W_2$ of the plurality of differently sized workpieces W. For example, some workpieces $W_1$, $W_2$ are formed such that the thickness of the material of the workpieces $W_1$, $W_2$ may not be the same, and, as a result, varies. In some instances, the lower end surface $W_L$ of one of the workpieces $W_1$, $W_2$ may be thicker than a sidewall portion of the workpieces $W_1$, $W_2$ that forms the outer side surface $W_O$. In some examples, the thickness of the sidewall portion of the workpieces $W_1$, $W_2$ that forms the outer side surface $W_O$ may vary around or vertically up and down the cylindrical sidewalls of the workpieces $W_1$, $W_2$. Thicker portions of the workpieces $W_1$, $W_2$ may, for example, be found at the lower end surface $W_L$ of one of the workpieces $W_1$, $W_2$ where the outer side surface $W_O$ meets the lower end surface $W_L$. Thick portions of material forming the workpieces $W_1$, $W_2$ may be commonly found at or around the flange portion $W_F$ of one of the workpieces $W_1$, $W_2$ or where the flange portion $W_F$ of one of the workpieces $W_1$, $W_2$ meets the body portion $W_B$ of one of the workpieces $W_1$, $W_2$. Accordingly, lower surface temperatures, and, thus, less effective transfer of the infusible sublimation ink I from the transfer sheet S to the outer side surface $W_O$ of one of the workpieces $W_1$, $W_2$ are more likely to occur at areas on the outer side surface $W_O$ of one of the workpieces $W_1$, $W_2$ of the plurality of differently sized workpieces W that coincide with these thicker "heat-sink portions" or other areas of the workpieces $W_1$, $W_2$ that are susceptible to conductive and convective heat losses.

Exemplary sublimation devices 10 that are described in the present disclosure provide a heat source that enables consistent transfer of heat H to the outer side surface $W_O$ of one of the workpieces $W_1$, $W_2$ of the plurality of differently sized workpieces W such that the entirety of the body portion $W_B$ of one of the workpieces $W_1$, $W_2$ of the plurality of differently sized workpieces W is available for sublimation as a result of the outer side surface $W_O$ of one of the workpieces $W_1$, $W_2$ being heated to a sufficient temperature, and, with sufficient consistency, for successful transfer of the infusible sublimation ink I from the transfer sheet S to the outer side surface $W_O$ of one of the workpieces $W_1$, $W_2$ of the plurality of differently sized workpieces W without dimmed or faded areas of the design A on the outer side surface $W_O$ of one of the workpieces $W_1$, $W_2$ of the plurality of differently sized workpieces W. In some implementations, the entirety of the body portion $W_B$ that is available for sublimation may include the outer side surface $W_O$ of one of the workpieces $W_1$, $W_2$ extending from the upper end surface $W_U$ of one of the workpieces $W_1$, $W_2$ of the plurality of differently sized workpieces W to the lower end surface $W_L$ of one of the workpieces $W_1$, $W_2$ of the plurality of differently sized workpieces W. Furthermore, the entirety of the body portion $W_B$ of one of the workpieces $W_1$, $W_2$ of the plurality of differently sized workpieces W that is available for sublimation may also include some of the body portion $W_B$ of one of the workpieces $W_1$, $W_2$ of the plurality of differently sized workpieces W that extend from either side of the flange portion $W_F$ of one of the workpieces $W_1$, $W_2$ of the plurality of differently sized workpieces W.

Referring to FIG. 6, another view of an exemplary sublimation device 10 including the workpiece engagement actuator 16 and the workpiece-engaging device 18 that form the cavity 20 is shown. In some configurations, the workpiece-engaging device 18 includes a heating assembly 24 formed by one or more materials or one or more material layers that form the substantially cylindrical sidewall of the workpiece-engaging device 18 that may contribute to at least partially forming the cylindrical cavity 20.

In some configurations, the heating assembly 24 includes the heater 26 and/or the base heater 76. The heater 26 may include, for example, one or more layers of material (not shown) disposed adjacent one another and then formed into the substantially cylindrical shape of the workpiece-engaging device 18 such that the one or more layers of material are disposed concentric to one another. Furthermore, the base heater 76 may be disposed adjacent a lower end of the heater 26 for enclosing a bottom end of the substantially cylindrical shape of the heater 26, which may alternatively be referred to as a "heat pad". As seen at FIG. 6, in some instances, an innermost layer of the one or more layers of the cylindrical portion of heating assembly 24 may include the heater 26; accordingly an innermost layer of the heater 26 may define the inner cylindrical wall 18' of the workpiece-engaging device 18 that is configured to contact the outer side surface $W_O$ of one of the workpieces $W_1$, $W_2$ of the plurality of differently sized workpieces W.

In some implementations, the top surface of base heater 76 may be arranged perpendicular to the central axis $A_{20}$-$A_{20}$ of the cavity 20. In this way, when one of the workpieces $W_1$, $W_2$ of the plurality of differently sized workpieces W is placed within the cavity 20, the top surface of base heater 76 contacts the lower end surface $W_L$ of one of the workpieces $W_1$, $W_2$ of the plurality of differently sized workpieces W to provide an axial transfer of heat H to one of the workpieces $W_1$, $W_2$ of the plurality of differently sized workpieces W from below in addition to a radially-inwardly-directed transfer of heat H to the outer side surface $W_O$ of one of the workpieces $W_1$, $W_2$ of the plurality of differently sized workpieces W from the heater 26. The base heater 76 provides heat H to the lower end surface $W_L$ of one of the workpieces $W_1$, $W_2$ of the plurality of differently sized workpieces W so that the lower end surface $W_L$ does not act as a heat sink that draws heat away from the lower end surface $W_L$ of one of the workpieces $W_1$, $W_2$ of the plurality of differently sized workpieces W where the lower end surface $W_L$ meets the outer side surface $W_O$ during sublimation. In other words, the base heater 76 heats the lower end surface $W_L$ of one of the workpieces $W_1$, $W_2$ of the plurality of differently sized workpieces W during sublimation to minimize a temperature difference or temperature gradient between the lower end surface $W_L$ and a portion edge of the outer side surface $W_O$ that is near or extends from the lower end surface $W_L$. As such, a transfer of heat H from the portion edge of the outer side surface $W_O$ that is near or extends from the lower end surface $W_L$ into the lower end surface $W_L$ of one of the workpieces $W_1$, $W_2$ of the plurality of differently sized workpieces W, which would otherwise reduce the temperature at the portion edge of the outer side surface $W_O$ that is near or extends from the lower end surface $W_L$ is minimized or eliminated.

In some instances, the base heater 76 may be configured to heat H the lower end surface $W_L$ of one of the workpieces $W_1$, $W_2$ of the plurality of differently sized workpieces W such that the lower end surface $W_L$ is hotter than the outer side surface $W_O$ of one of the workpieces $W_1$, $W_2$ of the plurality of differently sized workpieces W during sublimation, causing the portion edge of the outer side surface $W_O$ that is near or extends from the lower end surface $W_L$ to increase in temperature relative to the rest of the outer side surface $W_O$. This increased temperature at the portion edge of the outer side surface $W_O$ that is near or extends from the lower end surface $W_L$ may offset any potential convective heat losses introduced by ambient airflow into the cavity 20 that travels near the lower end surface $W_L$.

Accordingly, while the user may not be transferring the infusible sublimation ink I from the transfer sheet S to the lower end surface $W_L$ of one of the workpieces $W_1$, $W_2$ of the plurality of differently sized workpieces W, the heat H provided to the lower end surface $W_L$ enables the heater 26 to heat the portion edge of the outer side surface $W_O$ that is near or extends from the lower end surface $W_L$ without the lower end surface $W_L$ reducing the surface temperature of the portion edge of the outer side surface $W_O$ that is near or extends from the lower end surface $W_L$ due to conductive heat losses and/or convective heat losses. Thus, temperatures at or near the portion edge of the outer side surface $W_O$ that is near or extends from the lower end surface $W_L$ may be maintained consistent with the rest of the outer side surface $W_O$ of one of the workpieces $W_1$, $W_2$ of the plurality of differently sized workpieces W so that the infusible sublimation ink I transferred thereto is not faded or dimmed at one or more regions at or near the portion edge of the outer side surface $W_O$ that is near or extends from the lower end surface $W_L$ during the sublimation process.

Figure 8:
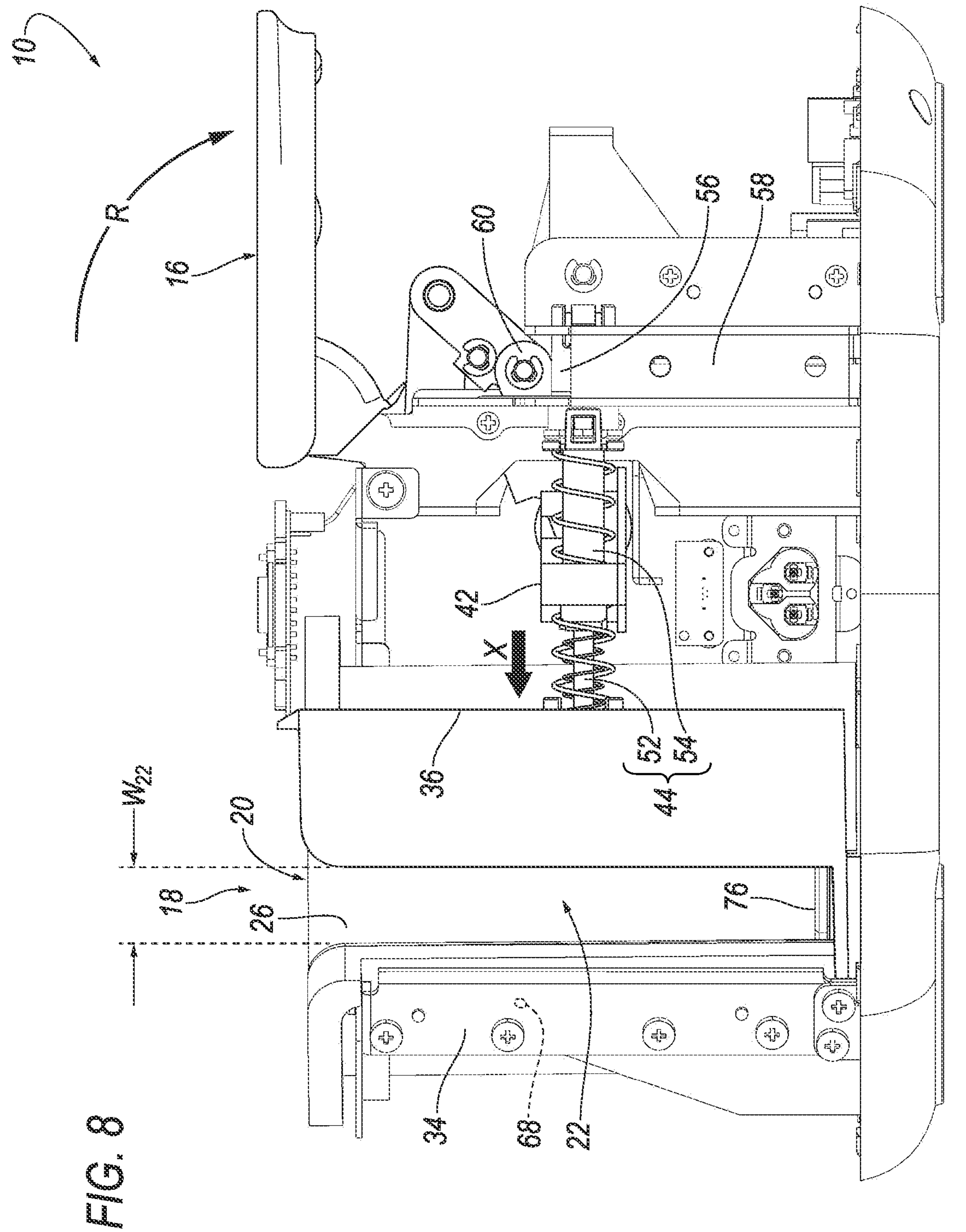
FIG. 8 is a side view of the sublimation device of FIGS. 1-2 with the outer housing removed, whereby the sublimation device is arranged in the disengaged orientation of FIG. 3 and without a workpiece arranged within the cavity of the sublimation device.
Figure 9:
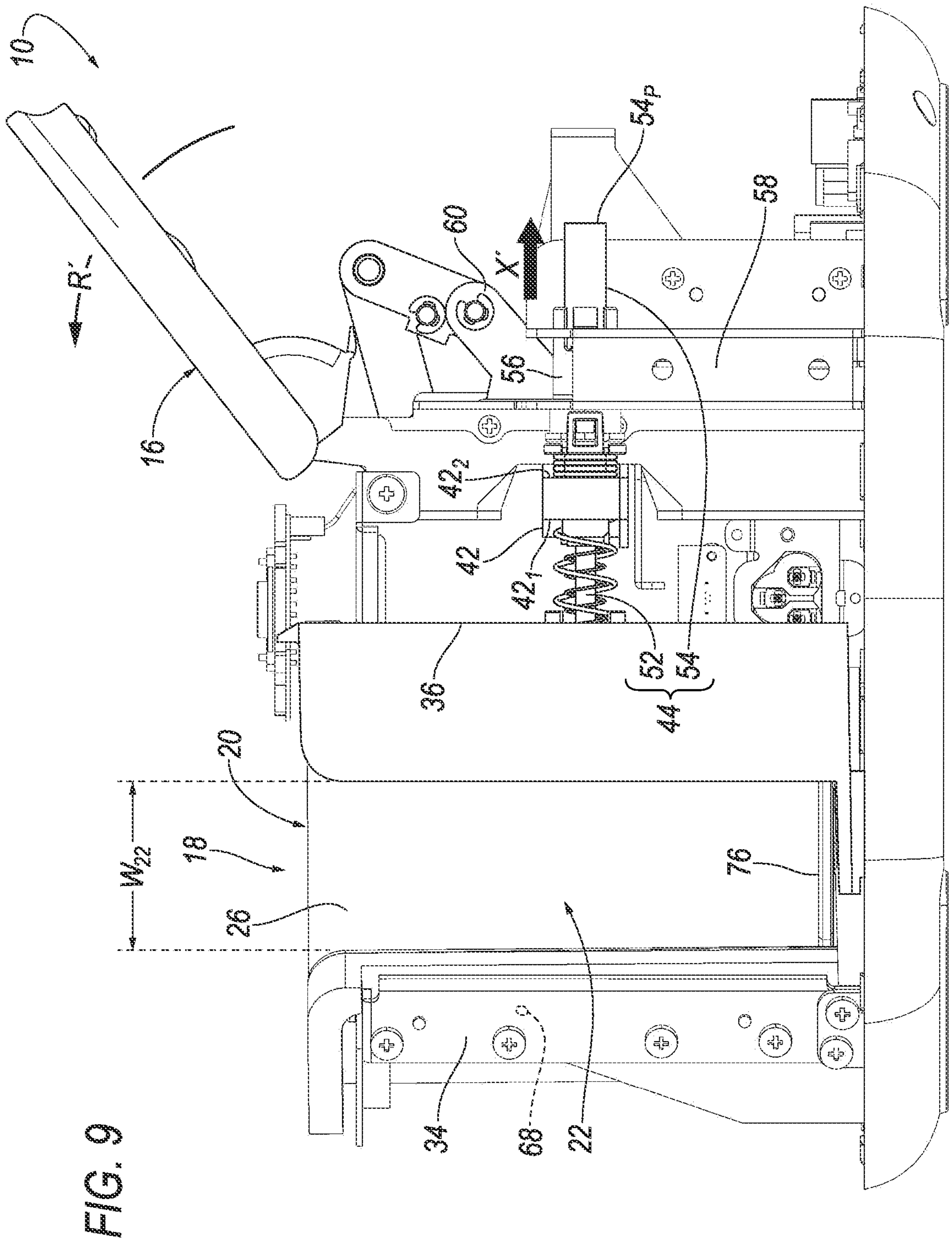
FIG. 9 is another side view of the sublimation device according to FIG. 8 with the outer housing removed whereby the sublimation device is arranged in the engaged orientation of FIG. 4 or 5 and with a workpiece arranged within the cavity of the sublimation device.

With reference to FIG. 7, an exemplary configuration of the intervening connecting structure or linkage assembly 48 that connects the workpiece engagement actuator 16 to the workpiece-engaging device 18 is shown. As described above, movement R/R' of the workpiece engagement actuator 16 is translated by the intervening connecting structure or linkage assembly 48 such that, for example: (1) upon raising of the workpiece engagement actuator 16 to the up orientation (as seen at FIG. 9), the intervening connecting structure or linkage assembly 48 causes the workpiece-engaging device 18 to disengage, release, or “open”; and (2) upon lowering of the workpiece engagement actuator 16 to the down orientation (as seen at FIG. 8), the intervening connecting structure or linkage assembly 48 causes the workpiece-engaging device 18 to engage or “close”.

In some configurations, the intervening connecting structure or linkage assembly 48 includes a vertical push bar 36, a transverse push bar 42, a dual shaft assembly 44 (that includes a push shaft 52 extending from a first side $\mathbf{42}_1$ of the transverse push bar 42 and a guide shaft 54 extending from a second side $\mathbf{42}_2$ of the transverse push bar 42 that is opposite the first side $\mathbf{42}_1$ of the transverse push bar 42), a stationary shaft 56, a stationary shaft grounding bracket 58, and a push link 60. A distal end 52D of the push shaft 52 may be fixed to vertical push bar 36. A proximal end 52$p$ of the push shaft 52 may be fixed to the first side $\mathbf{42}_1$ of the transverse push bar 42. A distal end 54D of the guide shaft 54 may be fixed to the second side $\mathbf{42}_2$ of the transverse push bar 42. A proximal end 54$p$ of the guide shaft 54 may be axially slidably-disposed within an axial bore of the stationary shaft 56 along an axis $A_{44}$-$A_{44}$ of the dual shaft assembly 44 (that extends through and is axially aligned with an axial length of all of the push shaft 52, the guide shaft 54, and the stationary shaft 56). The stationary shaft 56 may be secured to the stationary shaft grounding bracket 58 that extends vertically from and is fixed to a lower panel 14L of the outer housing 14.

As seen at FIG. 7, the workpiece engagement actuator 16 may be connected to the push link 60, and the push link 60 may be connected to the transverse push bar 42. The guide shaft 54 is arranged for axial movement along the axis $A_{44}$-$A_{44}$ through the stationary shaft 56 (see comparatively, e.g., FIGS. 8 and 9 where, at FIG. 8, the guide shaft 54 is urged through the axial bore of the stationary shaft 56 and toward the vertical push bar 36 according to the direction of the arrow X, and, as seen at FIG. 9 the guide shaft 54 is urged through the axial bore of the stationary shaft 56 and away from the vertical push bar 36 according to the direction of the arrow X' that is opposite the direction of the arrow X). For example, as seen at FIG. 8, when the workpiece engagement actuator 16 is rotated downward R, the push link 60 urges the transverse push bar 42 forward toward the vertical push bar 36; as the transverse push bar 42 is thus urged, the guide shaft 54, to which the transverse push bar 42 is fixed to travels forward axially along the axis $A_{44}$-$A_{44}$ according to the direction of the arrow X, and, as such, axially travels through the stationary shaft 56 as described above. Accordingly, when the workpiece engagement actuator 16 is rotated upwardly R', a correspondingly opposite movement of the guide shaft 54 results whereby the guide shaft moves according to the direction of the arrow X'.

With continued reference to FIG. 7, in some configurations, the intervening connecting structure or linkage assembly 48 may further include a left jaw bracket 34, a first spring 62 and a second spring 64. As seen at FIG. 7, the left jaw bracket 34 may be arranged substantially parallel to and spaced apart from the vertical push bar 36 for at least partially forming the gap 22. Furthermore, as seen at FIG. 7, the left jaw bracket 34 may be secured to a first end or a fixed end of $\mathbf{26}_1$ of the heater 26 and the vertical push bar 36 may be secured to a second end or a movable end $\mathbf{26}_2$ of the heater 26; furthermore, the first end or the fixed end of $\mathbf{26}_1$ of the heater 26 may be arranged substantially parallel to and spaced apart from the second end or the movable end $\mathbf{26}_2$ of the heater 26 for at least partially forming the gap 22.

In some configurations, the first spring 62 and the second spring 64 are concentrically positioned with each other along the axis $A_{44}$-$A_{44}$ and surrounds the push shaft 52 whereby the first spring 62 surrounds the push shaft 52 and the second spring 64 surrounds the first spring 62. In other alternative configurations, the first spring 62 and the second spring 64 may be arranged in an axially abutting relationship with each of the first spring 62 and the second spring 64 around the push shaft 52. As seen at FIGS. 7 and 8, after the workpiece engagement actuator 16 is rotated downward R the first spring 62 and the second spring 64 may be disposed between the vertical push bar 36 and the transverse push bar 42 so that when the transverse push bar 42 is urged forwardly according to the direction of the arrow X for arranging the workpiece-engaging device 18 in the engaged orientation or “closed” position, the first spring 62 and the second spring 64 also urge the vertical push bar 36 forwardly according to the direction of the arrow X toward the left jaw bracket 34 such a width $W_{22}$ (as comparatively seen at FIGS. 8 and 9) of the gap 22 is reduced.

Conversely, as seen at FIG. 9, when the workpiece engagement actuator 16 is lifted/rotated upward R', the vertical push bar 36 is moved rearwardly according to the direction of the arrow X' away from the left jaw bracket 34 such that the width $W_{22}$ (as comparatively seen at FIGS. 8 and 9) of the gap 22 is increased. This is done as the push link 60 of the intervening connecting structure or linkage assembly 48 urges the transverse push bar 42 back toward the stationary shaft grounding bracket 58 according to the direction of the arrow X' when workpiece engagement actuator 16 is rotated upwardly R'.

The inclusion of at least one spring of the first spring 62 and the second spring 64 in the exemplary the intervening connecting structure or linkage assembly 48 may achieve a sufficient force for pressing the vertical push bar 36 toward the left jaw bracket 34 when one of the workpieces $W_1$, $W_2$ of the plurality of differently sized workpieces W is arranged within the cavity 20 due to the combined spring rate of the first spring 62 and the second spring 64. Advantageously, a sufficient total spring rate may be achieved with each of the first spring 62 and the second spring 64 having a lesser spring rate than that of the combined spring rate. In this way, neither of the first spring 62 and the second spring 64 will plastically deform while providing the higher combined spring rate and resulting force.

In some configurations, the combined spring rate may produce enough of a radially-inwardly-directed force or pressure P (see, e.g., FIG. 14A) toward the central axis $A_{20}$-$A_{20}$ that extends through the axial center of the cavity 20 that is ultimately applied to the outer side surface $W_O$ of one of the workpieces $W_1$, $W_2$ of the plurality of differently sized workpieces W during sublimation (see, e.g., FIGS. 15A-15D). In some instances, the applied force or pressure P may be between approximately about 0.5 psi and 1.0 psi. In order to produce such an exemplary combined spring rate, the spring rate of the first spring 62 may be between approximately about 45 Newtons (N) and 80N, and the spring rate of the second spring 64 may be between approximately about 25N and 40N.

In some implementations, a concentrically or axially-abutting triple spring configuration or quadruple spring configuration (in combination with the first spring 62 and the second spring 64) may be employed in order to combine the spring rate of, for example, a plurality of smaller springs, as described above. Accordingly, in some configurations, in addition to the first spring 62 and the second spring 64, the intervening connecting structure or linkage assembly *48t* may include, for example, a total of: three springs; four springs; or more than four springs. In some configurations, a total of four springs may be situated between the transverse push bar 42 and the vertical push bar 36. As noted above, any combination of multiple springs may be concentrically or axially-abutting with one another, or, alternatively, situated separately to the side of the push shaft 52 or elsewhere between the transverse push bar 42 and the vertical push bar 36.

In some implementations, because the transverse push bar 42 is fixedly attached to the push link 60, the transverse push bar 42 and the guide shaft 54 travel according to the direction of either of the arrows X and X' at a fixed distance as workpiece engagement actuator 16 is lifted or rotated upwardly R' or downwardly R, regardless of the size of the one of the workpieces $W_1$, $W_2$ of the plurality of differently sized workpieces W being clamped within the cavity 20. In order to accommodate differently sized workpieces $W_1$, $W_2$ of the plurality of differently sized workpieces W within the cavity 20 while applying consistent force thereon, the distance between the transverse push bar 42 and the vertical push bar 36, and, thus, the distance that the push shaft 52 travels relative to the guide shaft 54 may vary depending on the size of the workpieces $W_1$, $W_2$ of the plurality of differently sized workpieces W. Accordingly, larger workpieces $W_1$, $W_2$ of the plurality of differently sized workpieces W will result in less travel by the vertical push bar 36 before sufficient pressure is reached against the outer side surface $W_O$ of one of the workpieces $W_1$, $W_2$ of the plurality of differently sized workpieces W due to the force or pressure P arising from the first spring 62 and the second spring 64.

In order to maintain the same force or pressure P on variously sized workpieces $W_1$, $W_2$ of the plurality of differently sized workpieces W, the multi-spring configuration shown at FIGS. 7-9 may include one or more (e.g., the first spring 62 and the second spring 64) that is configured to maintain a constant (or "flat") spring rate across the required range of compression that accommodates different sized workpieces $W_1$, $W_2$ of the plurality of differently sized workpieces W. In addition, a flat spring rate across the compression range of the first spring 62 and the second spring 64 ensures a consistent resistive force is provided by the workpiece engagement actuator 16 by the user throughout its entire range of operating motion according to the direction of the arrows R, R'. This exemplary consistent resistance may provide a smooth, consistent, and, therefore, pleasing tactile experience to the user as, for example a user presses his/her hand adjacent the workpiece engagement actuator 16 for pushing the workpiece engagement actuator 16 in the direction of the arrow R. In order to flatten the spring rate across the compression range of the first spring 62 and the second spring 64, in some configurations, the first spring 62 and the second spring 64 may be pre-compressed between the transverse push bar 42 and the vertical push bar 36, even when workpiece engagement actuator 16 is arranged in an "up" orientation (as seen at, e.g., FIG. 3) and the workpiece-engaging device 18 is arranged in a withdrawn orientation (within the outer housing 14 as seen at, e.g., FIG. 3).

In general, the smaller the individual spring rates of each of the first spring 62 and the second spring 64, the flatter the spring rate will be across the compression range. Thus, the smaller individual spring rates of the first spring 62 and the second spring 64 that contribute to the total spring rate of the dual spring configuration also contribute to a flatter spring rate across the compression range of the first spring 62 and the second spring 64.

With continued reference to FIG. 7, in some instances, the sublimation device 10 may include one or more temperature sensors 68 disposed at or near a surface of heater 26 that is configured to be arranged adjacent the outer side surface $W_O$ of one of the workpieces $W_1$, $W_2$ of the plurality of differently sized workpieces W in order to detect the temperature of the heater 26. The one or more temperature sensors 68 may send a signal indicating temperature to a processor (see, e.g., the processor $150_1$ of a CPU 150 of the sublimation device 10 at FIG. 16) in communication with a heating element (not shown) disposed within or as a part of the heater 26 or in communication with a controller or control device of the heating element. In this way, one or more temperature sensors 68 may send a signal as part of a temperature feedback loop controlled by the processor $150_1$ and/or controller.

In some configurations, as part of the temperature control algorithm provided by the processor $150_1$ and/or controller, and under normal sublimation circumstances with one of the workpieces $W_1$, $W_2$ of the plurality of differently sized workpieces W present within the cavity 20 and the workpiece-engaging device 18 closed, the processor $150_1$ maintains the temperature of the heater 26 at a certain temperature for a certain amount of time appropriate for sublimating the infusible sublimation ink I sublimation onto the outer side surface $W_O$ of one of the workpieces $W_1$, $W_2$ of the plurality of differently sized workpieces W, as described above.

With reference to FIGS. 2, 6, and 7, in conjunction with a temperature control process/algorithm, the sublimating device 10 may include one or more indicators 74 that may be associated with a user-interface of the sublimating device 10. The one or more indicators 74 may include, for example, one or more light emitting diodes (LEDs) that emit a constant light, a flashing light, and/or a color-changing light.

Figure 10:
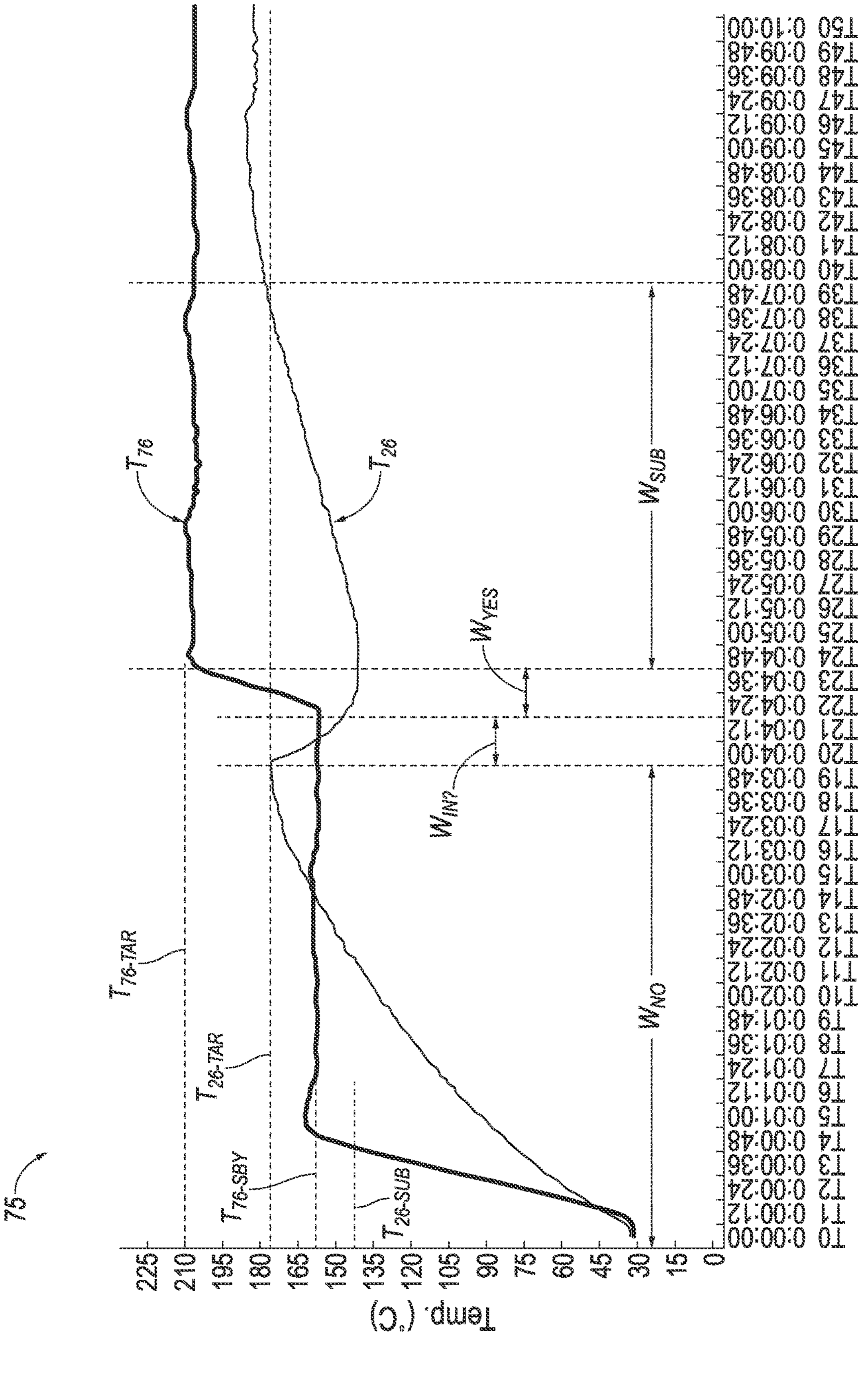
FIG. 10 illustrates a plot of temperature vs. time during operation of the sublimation device of FIGS. 1-2 when a workpiece is arranged within the cavity of the sublimation device, according to the present disclosure.

Referring to FIG. 10, a plot 75 of temperature (see the vertical “Y-axis”) vs. time (see the horizontal “X-axis”) during operation of the sublimation device 10 is illustrated. The Y-axis ranges between, for example, 0° C. to 225° C. in fifteen unit increments of ° C. The X-axis ranges between, for example, 0-seconds (at time T0) to 10-minutes (at time T50) in twelve second increments. Although the Y-axis and X-axis ranges are described above range between, respectively, 0° C. to 225° C. in fifteen unit increments of ° C. and 0-seconds to 10-minutes in twelve second increments, the ranges shown and described at FIG. 10 are exemplary and not intended to limit the present disclosure to the illustrated embodiment.

The plot 75 generally includes two temperature curves $T_{26}$, $T_{76}$ over time. A first temperature curve $T_{26}$ of the two temperature curves $T_{26}$, $T_{76}$ over time is directed to a change of temperature of the heater 26. A second temperature curve $T_{76}$ of the two temperature curves $T_{26}$, $T_{76}$ over time is directed to a change of temperature of the base heater 76.

With continued reference to FIG. 10, a plurality of horizontal dashed lines extending away from the Y-axis are seen generally at $T_{26\text{-}TAR}$, $T_{26\text{-}SUB}$, $T_{76\text{-}TAR}$, and $T_{76\text{-}SBY}$. The horizontal dashed line $T_{76\text{-}TAR}$ is a predetermined target temperature of the base heater 76 for performing a sublimation process (i.e., the process of the sublimating device 10 sublimating the infusible sublimation ink I onto the outer side surface $W_O$ of one of the workpieces $W_1$, $W_2$ of the plurality of differently sized workpieces W). The predetermined target temperature $T_{76\text{-}TAR}$ may be equal to approximately, for example, 210° C. (+/−10%).

The horizontal dashed line $T_{26\text{-}TAR}$ is a predetermined target temperature of the heater 26 for performing the sublimation process. The predetermined target temperature $T_{26\text{-}TAR}$ may be equal to approximately, for example, 185° C. (+/−10%).

The horizontal dashed line $T_{76\text{-}SBY}$ is a predetermined standby temperature of the base heater 76 that the base heater 76 may be maintained at after activating or turning on the sublimating device 10 and before performing the sublimation process. The predetermined standby temperature $T_{76\text{-}SBY}$ of the base heater 76 may be equal to approximately, for example, 165° C. (+/−10%).

The horizontal dashed line $T_{26\text{-}SUB}$ is related to a temperature increase inflection point of the heater 26 that occurs approximately: (1) after a decrease in temperature from the predetermined target temperature $T_{26\text{-}TAR}$ resulting from one of the workpieces $W_1$, $W_2$ of the plurality of differently sized workpieces W being initially inserted into the cavity 20 (see, e.g., time period $W_{IN?}$); (2) upon the one of the workpieces $W_1$, $W_2$ of the plurality of differently sized workpieces W being fully inserted in the cavity 20 (see, e.g., time period $W_{YES}$); and (3) when the one of the workpieces $W_1$, $W_2$ of the plurality of differently sized workpieces W is maintained within the cavity 20 and the process of the sublimating device 10 sublimating the infusible sublimation ink I onto the outer side surface $W_O$ of one of the workpieces $W_1$, $W_2$ of the plurality of differently sized workpieces W is initiated and maintained (see, e.g., the time period $W_{SUB}$). The horizontal dashed line $T_{26\text{-}SUB}$ may be equal to approximately, for example, 135° C. (+1-10%).

With reference to the origin of the plot 75 and reading the curves associated with the temperature $T_{26}$ of the heater 26 and the temperature $T_{76}$ of the base heater 76 left-to-right, an exemplary method 100 (see also, e.g., FIG. 11) of operating the sublimating device 10 is now described. After actuating, turning-on, or powering-on the sublimating device 10 (see, e.g., step 102 at FIG. 11) by pressing, for example, the button 80, the temperature $T_{26}$, $T_{76}$, of, respectively, the heater 26 and the base heater 76 may be increased (see, e.g., step 104 at FIG. 11) to approximately, for example, 30° C. at time T1. Thereafter: (1) the temperature $T_{76}$ of the base heater 76 may quickly or sharply increase over time (e.g., in a substantially linear fashion) from about, for example, time T1 to about, for example, time T5 until the temperature $T_{76}$ of the base heater 76 reaches the predetermined standby temperature $T_{76\text{-}SBY}$ (e.g., approximately 165° C.) of the base heater 76; and (2) the temperature $T_{26}$ of the heater 26 may progressively increase over time (e.g., in a substantially non-linear, curved fashion) from about, for example, time T1 to about, for example, time T20 until the temperature $T_{26}$ of the heater 26 reaches the predetermined target temperature $T_{26\text{-}TAR}$ (e.g., approximately 185° C.) of the heater 26. As seen at FIG. 10, the temperature $T_{76}$ of the base heater 26 may be maintained at the predetermined standby temperature $T_{76\text{-}SBY}$ from about, for example, time T5 to about, for example, time T22.

At about time T20, the user may then place (see, e.g., step 106 to step 108 at FIG. 11) one of the workpieces $W_1$, $W_2$ of the plurality of differently sized workpieces W into the cavity 20 (when the sublimating device 10 is arranged as seen at FIG. 3) and rotate R the workpiece engagement actuator 16 downwardly in order to ultimately arrange the workpiece-engaging device 18 in the engaged or “closed” orientation so that the heater 26 may contact and heat H the transfer sheet S and the outer side surface $W_O$ of one of the workpieces $W_1$, $W_2$ of the plurality of differently sized workpieces W for sublimating the infusible sublimation ink I that is carried on the transfer sheet S onto the outer side surface $W_O$ of one of the workpieces $W_1$, $W_2$ of the plurality of differently sized workpieces W. Alternatively, the user may place one of the workpieces $W_1$, $W_2$ of the plurality of differently sized workpieces W into the cavity 20 without arranging the workpiece-engaging device 18 in the engaged or “closed” orientation and may do so when, for example, the one or more indicators 74 alerts the user to arrange the workpiece-engaging device 18 in the engaged or “closed” orientation to begin the sublimation process.

Accordingly, in this way, the temperature $T_{26}$ of the heater 26 may be increased to the target temperature $T_{26\text{-}TAR}$ before one of the workpieces $W_1$, $W_2$ of the plurality of differently sized workpieces W is subjected to heat H, rather than, for example, increasing the temperature $T_{26}$ of the heater 26 with one of the workpieces $W_1$, $W_2$ of the plurality of differently sized workpieces W present in a “closed” cavity 20. Without one of the workpieces $W_1$, $W_2$ of the plurality of differently sized workpieces W present in the cavity 20 (as seen at, e.g., a time period $W_{NO}$ between, e.g., about time T0 and about time T20), or, at least before the workpiece-engaging device 18 closes on one of the workpieces $W_1$, $W_2$ of the plurality of differently sized workpieces W if the one of the workpieces $W_1$, $W_2$ of the plurality of differently sized workpieces W is present in the cavity 20, an amount of time needed for increasing the temperature $T_{26}$ of the heater 26 to the target temperature $T_{26\text{-}TAR}$ may be quicker, and, as such, the transfer sheet S (that is arranged around one of the workpieces $W_1$, $W_2$ of the plurality of differently sized workpieces W as seen at, e.g., FIGS. 13B-13D) and one of the workpieces $W_1$, $W_2$ of the plurality of differently sized workpieces W are not subject to a cooler temperature $T_{26}$ of the heater 26 as the temperature $T_{26}$ of the heater 26 increases and emits heat H, which may negatively affect the sublimation process.

At, for example, time T20, once the target temperature $T_{26\text{-}TAR}$ of the heater 26 has been reached, the user may then arrange the workpiece-engaging device 18 in the engaged or "closed" orientation for directly engaging the transfer sheet S and one of the workpieces $W_1$, $W_2$ of the plurality of differently sized workpieces W that has been inserted into the cavity 20. Initially, until one of the workpieces $W_1$, $W_2$ of the plurality of differently sized workpieces W is fully heated H by the heater 26, one of the workpieces $W_1$, $W_2$ of the plurality of differently sized workpieces W acts as a heat sink that temporarily reduces the temperature $T_{26}$ of the heater 26 (as seen at, e.g., a time period $W_{IN?}$ between, e.g., about time T20 and about time T21) to approximately about the horizontal dashed line $T_{26\text{-}SUB}$ that may be equal to approximately about, for example, 135° C.

Upon the processor $\mathbf{150}_1$ receiving temperature data $T_{26}$ of the heater 26 from the one or more temperature sensors 68 that results in the processor $\mathbf{150}_1$ determining that the transfer sheet S and one of the workpieces $W_1$, $W_2$ of the plurality of differently sized workpieces W that has been inserted into the cavity 20 (as seen at, e.g., a time period $W_{YES}$ that starts at about time T22, the temperature control algorithm of the processor $\mathbf{150}_1$ will then react (see, e.g., step 108 at FIG. 11) in order to automatically increase the temperature $T_{26}$, $T_{76}$ of the sublimating device 10 by: (1) quickly or sharply increasing over time (e.g., in a substantially linear fashion) the temperature $T_{76}$ of the base heater 76 from about, for example, time T22 to about, for example, time T23 until the temperature $T_{76}$ of the base heater 76 reaches the predetermined target temperature $T_{76\text{-}TAR}$ (e.g., approximately about 210° C.) of the base heater 76; and (2) increasing the temperature $T_{26}$ of the heater 26 from the horizontal dashed line $T_{26\text{-}SUB}$ that may be equal to approximately about, for example, 135° C. back up to the target temperature $T_{26\text{-}TAR}$ of the heater 26 that may be equal to approximately about, for example, 185° C. for the appropriate duration (as seen at, e.g., a time period $W_{SUB}$ stating at about time T23 and ending at about time T40).

As seen at FIG. 10, the temperature $T_{76}$ of the base heater 26 is maintained at the predetermined target temperature $T_{76\text{-}TAR}$ from about, for example, time T23 to about, for example, time T50. Accordingly, a signal associated with the temporary temperature decrease $W_{IN?}$, $W_{YES}$ and the target temperatures $T_{26\text{-}TAR}$, $T_{76\text{-}TAR}$ described above may be communicated to the processor $\mathbf{150}_1$, and, as such, the processor $\mathbf{150}_1$ may send a signal to the one or more indicators 74 that will communicate to the user that sublimating device 10 is operable and performing the sublimation process (see, e.g., step 110 at FIG. 11 where the infusible sublimation ink I is sublimated onto the outer side surface $W_O$ of one of the workpieces $W_1$, $W_2$ of the plurality of differently sized workpieces W). Thereafter, the workpiece $W_1$, or $W_2$ may be removed from the sublimation device 10 (see, e.g., step 112 at FIG. 11) and the sublimation device 10 may be powered-off (see, e.g., step 114 at FIG. 11). The decrease in temperature $T_{26}$ of the heater 26 over a short period of time (see, e.g., collectively, approximately the time periods $W_{IN?}$ and $W_{YES}$) before the heater 26 recovers to approximately the target temperature $T_{26\text{-}TAR}$ (see, e.g., the time period $W_{SUB}$) is an indication to the processor $\mathbf{150}_1$ that one of the workpieces $W_1$, $W_2$ of the plurality of differently sized workpieces W has been placed in the cavity 20 when the workpiece-engaging device 18 is arranged in the engaged or "closed" orientation.

If, on the other hand, the workpiece-engaging device 18 is arranged in the engaged or "closed" orientation, and, at step 108', if the processor $\mathbf{150}_1$ determines that there is no temporary decrease (that would, for example, otherwise occur at time period $W_{IN?}$) in the temperature $T_{26}$ of the heater 26, the processor $\mathbf{150}_1$ may cease providing power (see, e.g., step 110' at FIG. 11) to the heater 26 so that the temperature $T_{26}$ of the heater 26 is lowered, and, as such, does not continue to provide heat H without the presence of one of the workpieces $W_1$, $W_2$ of the plurality of differently sized workpieces W that would otherwise absorb the emitted heat H in the cavity 20 (that would, for example, otherwise occur at time periods $W_{IN?}$, $W_{YES}$, and $W_{SUB}$). In such configurations, one or more other sensors (not shown) may detect and communicate to the processor $\mathbf{150}_1$ whether the workpiece-engaging device 18 has been arranged in the engaged or "closed" orientation so that both states of the workpiece-engaging device 18 (i.e., the "opened" orientation or "closed" orientation) and the presence of one of the workpieces $W_1$, $W_2$ of the plurality of differently sized workpieces W can be detected as described above. Thus, as noted above, in some configurations, when the workpiece-engaging device 18 is arranged in the engaged or "closed" orientation and one of the workpieces $W_1$, $W_2$ of the plurality of differently sized workpieces W is not present in the cavity 20 as described above, the auto-shutoff safety feature (see, e.g., steps 108', 110' at FIG. 11) will result in the surrounding atmosphere ambiently-cooling the heater 26.

In some examples, the auto shutoff feature (see, e.g., steps 108', 110' at FIG. 11) of sublimating device 10 may activate once one or more signals (e.g., the temperature $T_{26}$ of the heater 26 and the temperature $T_{76}$ of the base heater 76) associated with the plot 75 at FIG. 10 is communicated to the processor $\mathbf{150}_1$ for: (1) determining that no workpiece (e.g., workpieces $W_1$, $W_2$) of the plurality of differently sized workpieces W had been detected for a certain amount of time at step 108' (see, e.g., one or more of the time periods $W_{IN?}$ and $W_{YES}$) after the heater 26 is pre-heated to the target temperature $T_{26\text{-}TAR}$ (see, e.g., one or more of the time period $W_{NO}$); (2) the user has been alerted (e.g., by the one or more indicators 74) to arrange one of the workpieces $W_1$, $W_2$ of the plurality of differently sized workpieces W into the cavity 20; and (3) the workpiece-engaging device 18 is arranged in the engaged or "closed" orientation. The amount of time (according to, for example, the periods of time $W_{NO}$, $W_{IN?}$, $W_{YES}$) may vary in one or more embodiments; in some instances, the amount of time may, for example, be between approximately about 5-to-30 seconds (occurring at, e.g., between approximately time T20 and T23) in order to give enough time for the user to insert one of the workpieces $W_1$, $W_2$ of the plurality of differently sized workpieces W after being alerted (e.g., by the one or more indicators 74 at approximately about time T20) that the temperature $T_{26}$ of the heater 26 has reached the target temperature $T_{26\text{-}TAR}$. In other examples, the auto shutoff feature of sublimating device 10 may occur as a result of "user inactivity" associated with the sublimating device 10 (e.g., if, for example, the processor $\mathbf{150}_1$ determines that, for example, a user has not rotated R/R' or otherwise moved the workpiece engagement actuator 16 or depressed the button 80 for a period of time (e.g., about thirteen minutes)).

In some examples, regarding the auto shutoff method (see, e.g., steps 108', 110' at FIG. 11) described above, the temperature $T_{26}$ of the heater 26 may be reduced if: (1) no one of the workpieces $W_1$, $W_2$ of the plurality of differently sized workpieces W is detected in the cavity 20; and (2) the heater 26 is already pre-heated to the target temperature $T_{26\text{-}TAR}$, even when the workpiece-engaging device 18 is still arranged in the engaged or "open" orientation if the expected temperature $T_{26}$ of the heater 26 decrease (see, the time period $W_{IN?}$) is not detected within a certain amount of time after pre-heating the heater 26 (see, the time period $W_{NO}$). Accordingly, in some configurations related to the auto shutoff method described above, the temperature $T_{26}$ of the heater 26 may be reduced if: (1) no one of the workpieces $W_1$, $W_2$ of the plurality of differently sized workpieces W is detected in the cavity 20; (2) the heater 26 is already pre-heated to target temperature $T_{26\text{-}TAR}$; and (3) the workpiece-engaging device 18 is closed.

In some instances, at steps 106 and 108/108', the processor 150$_1$ automatically increases the temperature $T_{26}$, $T_{76}$ of the sublimating device 10 to the target temperature $T_{26\text{-}TAR}$ of the heater 26 and the predetermined target temperature $T_{76\text{-}TAR}$ of the base heater 76 by, for example, utilizing the one or more temperature sensors 68 for sensing a ramp rate (e.g., rate of increase) of one or both of the temperature $T_{26}$ of the heater 26 and the temperature $T_{76}$ of base heater 76. If, for example, the heating ramp rate associated with the temperature $T_{26}$ of the heater 26 is less than a predetermined value (e.g., 0.3° C./second to 0.5° C./second), then (e.g., based on the heating ramp rate) the processor 150$_1$ may determine that one of the workpieces $W_1$, $W_2$ of the plurality of differently sized workpieces W is arranged within the cavity 20 (and the method is advanced from step 106 to step 108). If, for example, the heating ramp rate associated with the temperature $T_{26}$ of the heater 26 is not equal to or less than the determined value (e.g., 0.3° C./second to 0.5° C./second) over a period of time (e.g., approximately twenty seconds), the method may be advanced from step 108' to step 110'.

Figure 12A:
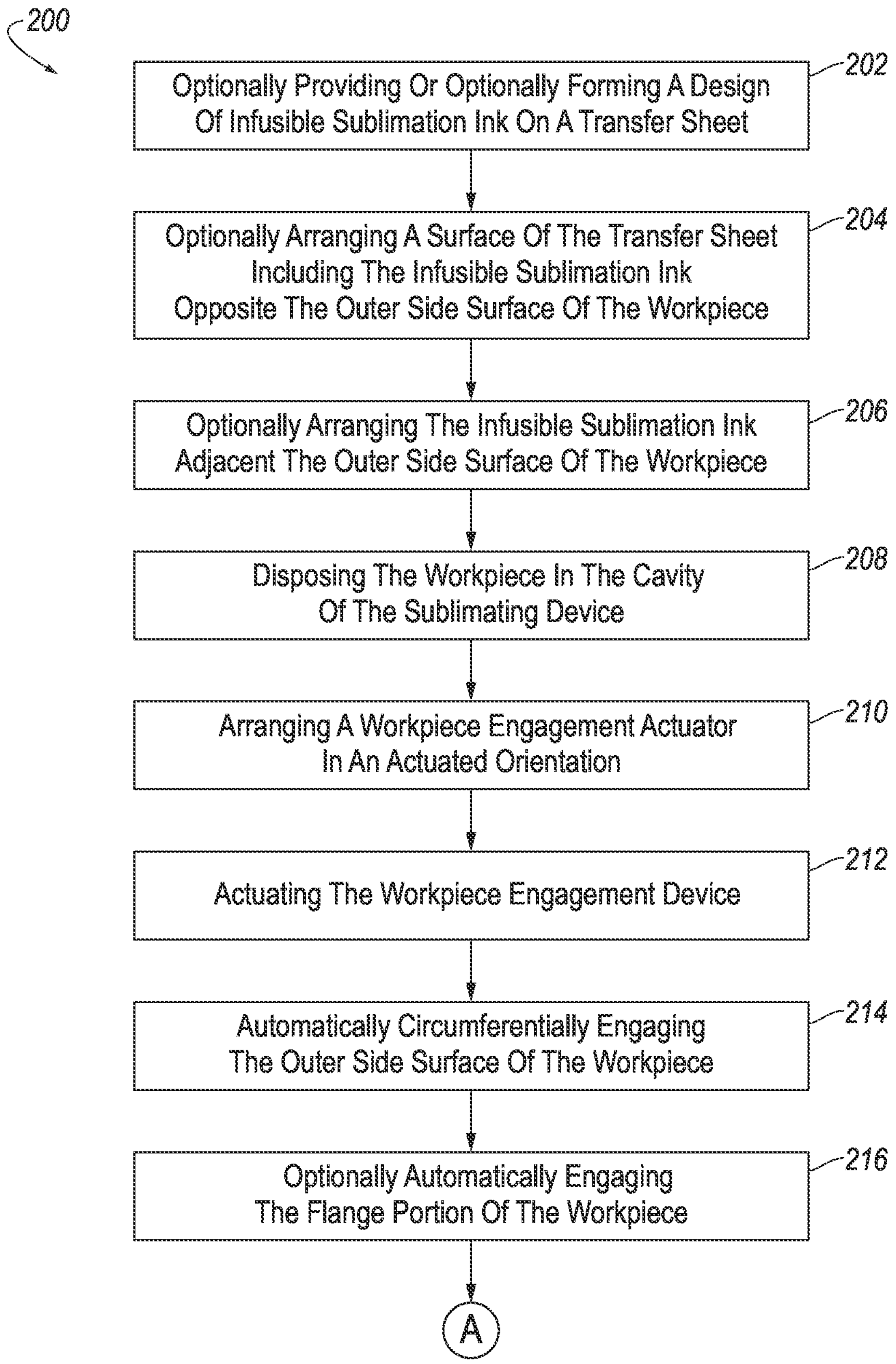
FIGS. 12A-12B is a flow chart of an exemplary method including a plurality of optional steps of utilizing the sublimation device of FIGS. 1-2 for sublimating a first design onto a first workpiece and the sublimating a second design onto a second workpiece that is different from the first workpiece according to the present disclosure.
Figure 12B:
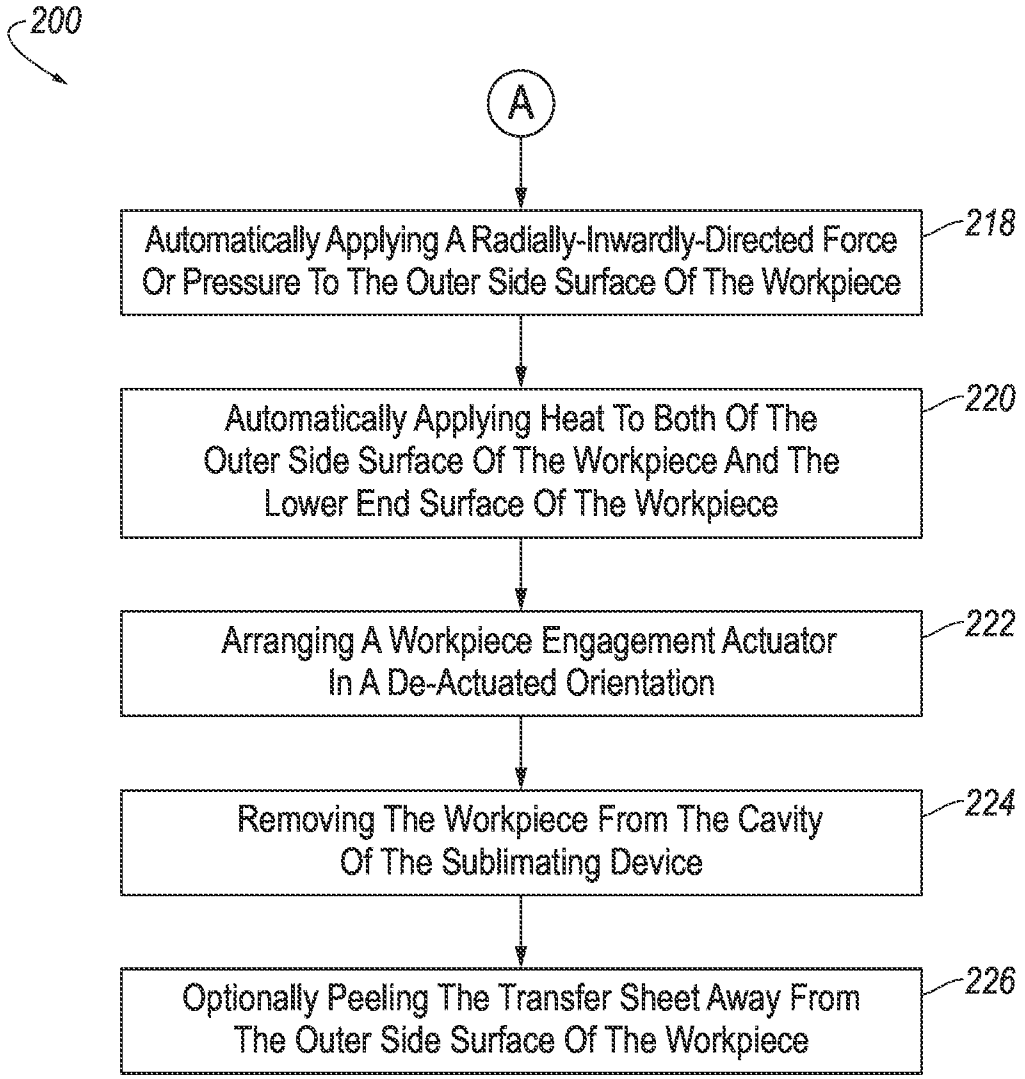
Figure 14A:
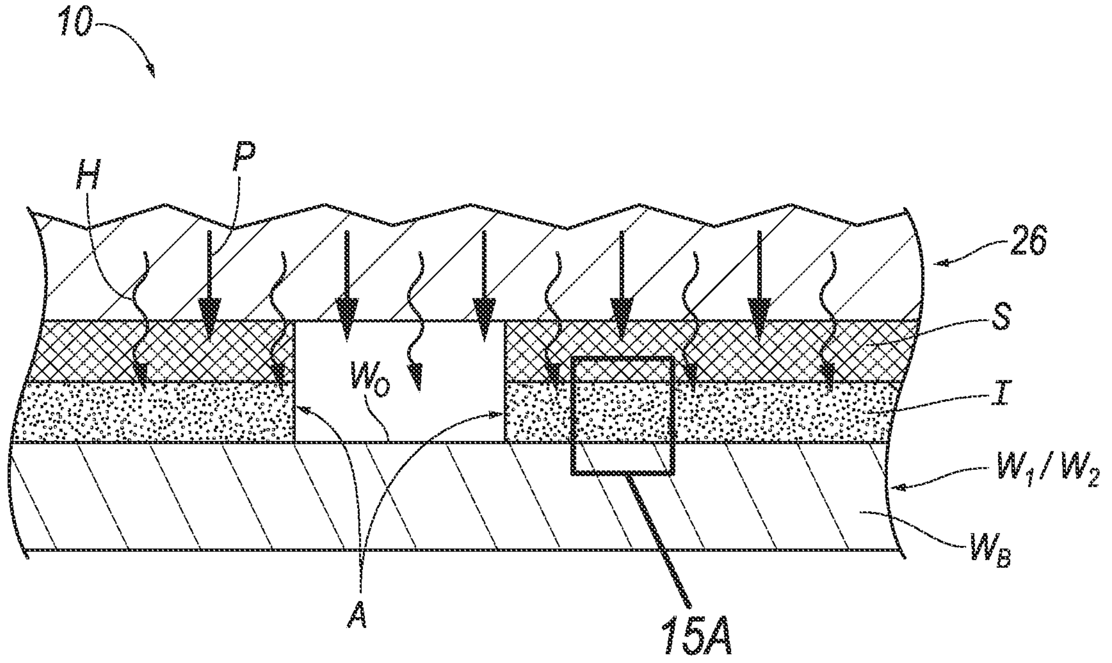
FIG. 14A is an enlarged cross-sectional view according to line 14A-14A of FIG. 13E illustrating a portion of a workpiece that is inserted into and is being subjected to heat and pressure from the sublimation device, according to the present disclosure.
Figure 14B:
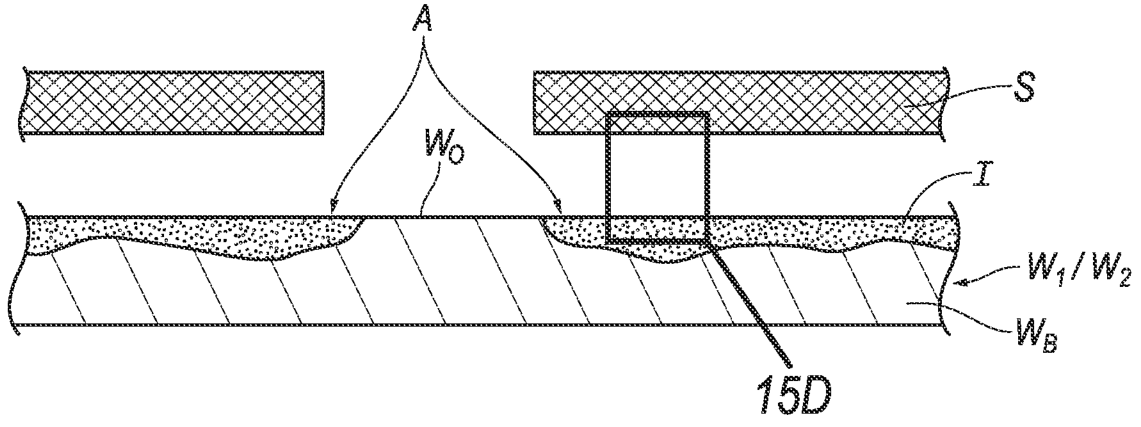
FIG. 14B is an enlarged cross-sectional view of the workpiece of FIG. 14A that includes sublimated ink from a transfer sheet, according to the present disclosure.

The method of operating the sublimating device 10 for sublimating the infusible sublimation ink I onto the outer side surface $W_O$ of one of the workpieces $W_1$, $W_2$ of the plurality of differently sized workpieces W is simplified as a result of, for example: no manual adjustments that may include one or more of temperature (see, e.g., heat H at FIG. 14A) and pressure (see, e.g., force or pressure P at FIG. 14A). Furthermore other methods (see, e.g., method 200 at FIGS. 12A-12B) of operating the sublimating device 10 for sublimating the infusible sublimation ink I onto the outer side surface $W_O$ of one of the workpieces $W_1$, $W_2$ of the plurality of differently sized workpieces W is simplified as a result of, for example: no manual adjustments that may include size of one of the workpieces $W_1$, $W_2$ of the plurality of differently sized workpieces W.

Figure 11:
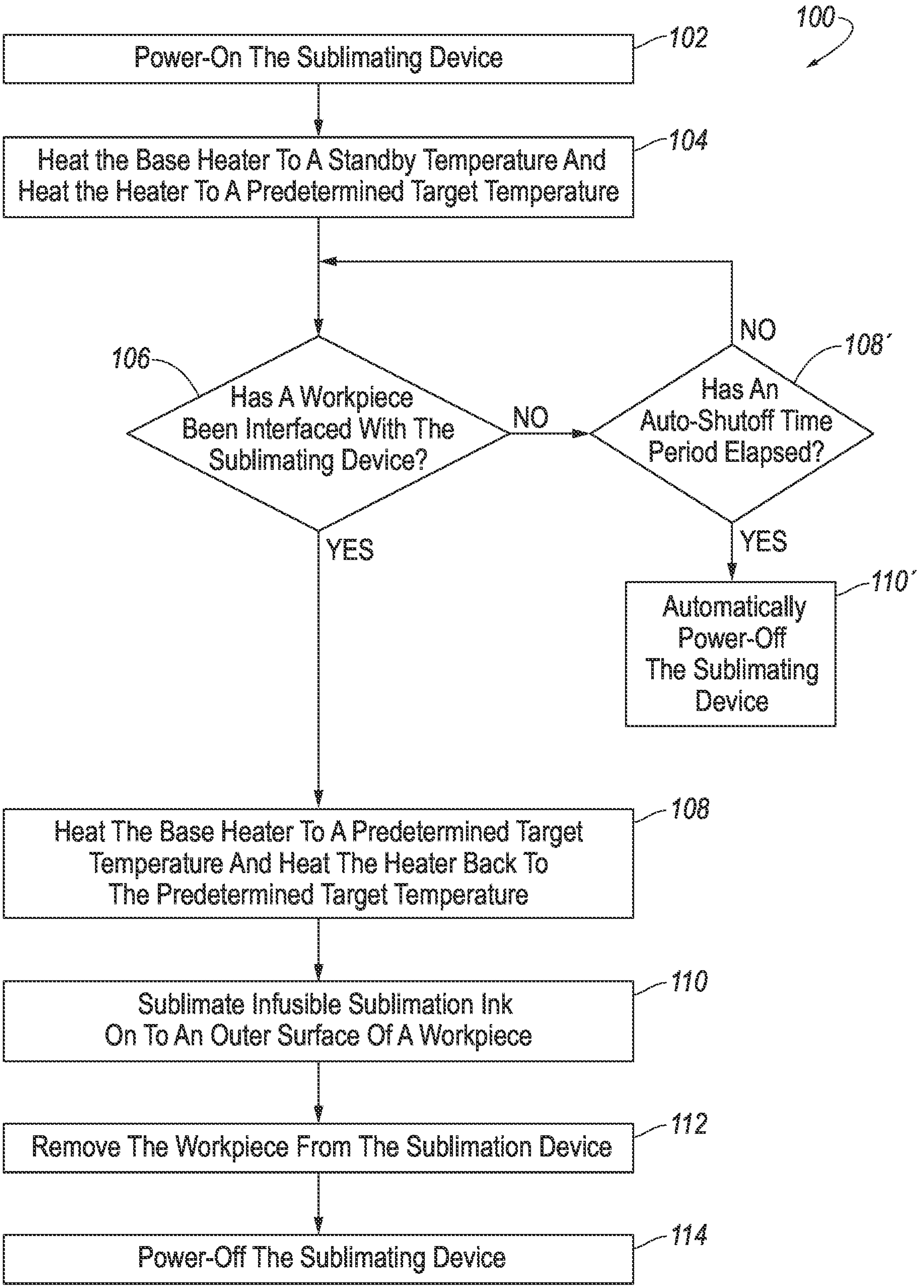
FIG. 11 is a flow chart of an exemplary method including a plurality of optional steps of utilizing the sublimation device of FIGS. 1-2 for sublimating a design onto a workpiece, according to the present disclosure.

With continued reference to FIG. 11, the method 100 may further include other steps or sub-steps associated with the steps 102-114. For example, after step 104 but before step 106, the method 100 may further include indicating, with the indicator 74, that the target temperature $T_{26\text{-}TAR}$ has been reached by the heater 26. In some instances, the user may wait for the indicator 74 to provide an alert before placing one of the workpieces $W_1$, $W_2$ of the plurality of differently sized workpieces W at least partially into the cavity 20 (see, e.g., step 106 to step 108 at FIG. 11) and/or before the user causing the heater 26 to be clamped against the outer side surface $W_O$ of one of the workpieces $W_1$, $W_2$ of the plurality of differently sized workpieces W.

Once the indicator 74 alerts the user that the heater 26 has reached the target temperature $T_{26\text{-}TAR}$, the method 100 is advanced to steps 106 and 108 where, after inserting one of the workpieces $W_1$, $W_2$ of the plurality of differently sized workpieces W at least partially into the cavity 20 (see also, e.g., FIGS. 13D-13E), after step 108, but before step 110, the method 100 may further include clamping/pressing the heater 26 against the outer side surface $W_O$ of one of the workpieces $W_1$, $W_2$ of the plurality of differently sized workpieces W (in response to, e.g., the user rotating R the workpiece engagement actuator 16 to the down orientation). In some implementations, the clamping/pressing step may be accomplished by pressing the workpiece engagement actuator 16 downwardly according to the direction of the arrow R (see, e.g., FIGS. 3 and 13D).

In some implementations, even prior to step 102 of the method 100, the method may also include (at least prior to step 106) placing the transfer sheet S is placed between the outer side surface $W_O$ of one of the workpieces $W_1$, $W_2$ of the plurality of differently sized workpieces W and the heater 26. Accordingly, when the workpiece-engaging device 18 is arranged in the "closed" orientation, the heater 26 presses, with a force or pressure P, the transfer sheet S against the outer side surface $W_O$ of one of the workpieces $W_1$, $W_2$ of the plurality of differently sized workpieces W.

In some instances, the placing of the transfer sheet S against the outer side surface $W_O$ of one of the workpieces $W_1$, $W_2$ of the plurality of differently sized workpieces W may occur before step 106 when one of the workpieces $W_1$, $W_2$ of the plurality of differently sized workpieces W is placed at least partially into the cavity 20. In some implementations, the placing of the transfer sheet S between the heater 26 and the outer side surface $W_O$ of one of the workpieces $W_1$, $W_2$ of the plurality of differently sized workpieces W may occur after one of the workpieces $W_1$, $W_2$ of the plurality of differently sized workpieces W has been at least partially inserted into the cavity 20 at step 106 but before the workpiece-engaging device 18 is arranged in the "closed" orientation for pressing the heater 26 against the outer side surface $W_O$ of one of the workpieces $W_1$, $W_2$ of the plurality of differently sized workpieces W.

At step 110, the duration of applying the heat H to the outer side surface $W_O$ of one of the workpieces $W_1$, $W_2$ of the plurality of differently sized workpieces W for performing the sublimation process may vary depending on, for example, ambient conditions and properties of one of the workpieces $W_1$, $W_2$ of the plurality of differently sized workpieces W. For example, in some implementations, step 110 may include increasing the duration of application of the heat H (see, e.g., period of time $W_{SUB}$ at FIG. 10) if the time it takes to reach the target temperature $T_{26\text{-}TAR}$ (at approximately, e.g., time T40 at FIG. 10) increases due to, for example: cooler ambient temperatures; an increased material thickness or variations in materials of one of the workpieces $W_1$, $W_2$ of the plurality of differently sized workpieces W. Accordingly, in some instances, the sublimating device 10 may sense the applied temperature from the heater 26 to one of the workpieces $W_1$, $W_2$ of the plurality of differently sized workpieces W and maintains that temperature for the required sublimation time. Thus, because the time it takes to reach the target temperature $T_{26\text{-}TAR}$ again after one of the workpieces $W_1$, $W_2$ of the plurality of differently sized workpieces W is clamped in receptacle and the temperature $T_{26}$ of the heater 26 temporarily decreases (see, e.g., FIG. 10), the duration of application of the heat H may vary.

In some implementations, during or after step 110 but before step 112, the method 100 may include alerting the user via the indicator 74 when the target temperature $T_{26\text{-}TAR}$ has been applied for a sufficient duration (see, e.g., period of time $W_{SUB}$ at FIG. 10) to accomplish sublimation of the infusible sublimation ink I onto the outer side surface $W_O$ of one of the workpieces $W_1$, $W_2$ of the plurality of differently sized to workpieces W. Accordingly, in some instances, before, after, or simultaneously with step 112, the method may be advanced to step 114 (i.e., the method 100 may include ceasing power (see, e.g., step 114) being provided to the heater 26 and/or the base heater 76 prior to step 112 when the target temperature $T_{26\text{-}TAR}$ has been applied for a sufficient duration to accomplish sublimation of the infusible sublimation ink I onto the outer side surface $W_O$ of one of the workpieces $W_1$, $W_2$ of the plurality of differently sized workpieces W).

In some implementations, prior to step 112, the method 100 may include arranging the workpiece-engaging device 18 in the "opened" orientation. By arranging the workpiece-engaging device 18 in the "opened" orientation, the heater 26 is released from being directly or indirectly arranged adjacent the outer side surface $W_O$ of one of the workpieces $W_1$, $W_2$ of the plurality of differently sized workpieces W; this step may be accomplished by lifting R' (see, e.g., FIG. 13E) the workpiece engagement actuator 16.

Although the methodology 100 described above at FIG. 11 is directed to interfacing a first workpiece (e.g., workpiece $W_1$), the method 100 may be carried out by interfacing, with the sublimating device 10, a second workpiece (e.g., workpiece $W_2$) that is different from the first workpiece as described above. In some instances, the workpieces $W_1$, $W_2$ may be differentiated by, for example, size. Accordingly, with reference to FIGS. 12A-12B, a method 200 for automatically configuring a shape of the sublimating device 10 for receiving a plurality of differently-sized workpieces W is now described.

Referring to FIGS. 12A-12B and 13A-13H, the method 200 for utilizing the sublimating device 10 is shown. As described above, the method 200 may include a step of automatically configuring a size or shape of a portion of the sublimating device 10 that receives one of the workpieces $W_1$, $W_2$ of the plurality of differently sized workpieces W whereby the workpieces $W_1$, $W_2$ may be defined by, for example, different diameters $D_1$, $D_2$. Firstly, as seen at FIG. 13A, the method 200 may include optionally providing or optionally forming 202 design A on a transfer sheet S formed by the infusible sublimation ink I. In some instances, the crafting machine 101, which is shown arranged upon the table 125, may optionally form (e.g., print and/or cut) the design A on and/or into the transfer sheet S; in some examples, a mat may support the transfer sheet S while the crafting machine 101 creates the design A. However, in other implementations, the transfer sheet S is shown including the design A formed by the infusible sublimation ink I may be separately purchased and not formed by the crafting machine 101.

As seen at FIG. 13B, the method 200 may include an optional step 204 of arranging a surface of the transfer sheet S that carries the infusible sublimation ink I opposite the outer side surface $W_O$ of one of the workpieces $W_1$, $W_2$ of the plurality of differently sized workpieces W. Then, as seen at FIG. 13C, the method 200 may include an optional step 206 of arranging the infusible sublimation ink I adjacent the outer side surface $W_O$ of one of the workpieces $W_1$, $W_2$ of the plurality of differently sized workpieces W; in such instances, the transfer sheet S may include a tacky surface that permits the transfer sheet S to be temporarily secured to the outer side surface $W_O$ of one of the workpieces $W_1$, $W_2$ of the plurality of differently sized workpieces W.

Referring to FIG. 13D, after the transfer sheet S is removably-secured to the outer side surface $W_O$ of one of the workpieces $W_1$, $W_2$ of the plurality of differently sized workpieces W, the method 200 may include a step of arranging the lower end surface $W_L$ of one of the workpieces $W_1$, $W_2$ of the plurality of differently sized workpieces W over the sublimation device 10 for being axially aligned with the central axis $A_{20}$-$A_{20}$ of the cavity 20. As seen at FIGS. 13A-13D, the workpiece engagement actuator 16 may be arranged in the first orientation (see also, e.g., FIG. 3) and the workpiece-engaging device 18 may be correspondingly arranged in the disengaged orientation. Thereafter, the method includes a step 208 of disposing the one of the workpieces $W_1$, $W_2$ of the plurality of differently sized workpieces W in the cavity 20.

Then, as seen at FIG. 13E, after the one of the workpieces $W_1$, $W_2$ of the plurality of differently sized workpieces W is disposed 208 within the cavity 20, the workpiece engagement actuator 16 may be arranged 210 in the second (actuated) orientation (see also, e.g., FIGS. 4 and 5) for actuating 212 the workpiece-engaging device 18 that results in the workpiece-engaging device 18 being arranged in the engaged orientation (see also, e.g., FIGS. 4 and 5). Once the workpiece engagement actuator 16 and the workpiece-engaging device 18 are arranged as described above at FIG. 13E, the heater 26 may automatically circumferentially engaging 214 the outer side surface $W_O$ of one of the workpieces $W_1$, $W_2$ of the plurality of differently sized workpieces W (irrespective of a size of the one of the workpieces $W_1$, $W_2$ of the plurality of differently sized workpieces W such as, for example, different diameters $D_1$, $D_2$ of the one of the workpieces $W_1$, $W_2$ of the plurality of differently sized workpieces W) by reducing the radius $R_{20}$ (see, e.g., FIG. 2) defines by the cavity 20. The method 200 may also include another optional step 216 of automatically engaging the flange portion $W_F$ of one of the workpieces $W_1$, $W_2$ of the plurality of differently sized workpieces W with a portion of the workpiece-engaging device 18 in response to step 212. Upon automatically circumferentially engaging 214 the outer side surface $W_O$ of one of the workpieces $W_1$, $W_2$ of the plurality of differently sized workpieces W, the method 200 includes utilizing the workpiece-engaging device 18 for automatically applying 218 a radially-inwardly-directed force or pressure P (see, e.g., FIG. 14A) thereto. Furthermore, upon the workpiece engagement actuator 16 and the workpiece-engaging device 18 are arranged as described above at FIG. 13E, the method 200 includes automatically applying 220 heat H from the heater 26 (see, e.g., FIG. 14A) to the outer side surface $W_O$ of one of the workpieces $W_1$, $W_2$ of the plurality of differently sized workpieces W as well as heat H from the base heater 76 to the lower end surface $W_L$ of one of the workpieces $W_1$, $W_2$ of the plurality of differently sized workpieces W. In other configurations, application 220 of the heat H may occur in response to, for example, the user depressing an actuator (see, e.g., the button 12).

As described above in the method of FIG. 11, the sublimation device 10 may include electronics (see, e.g., the processor $150_1$ of the CPU 150 at FIG. 16) that may monitor or sense the temperature (e.g., as a result of the temperature sensor 68 that may be communicatively-coupled to the processor $150_1$) associated with the applied heat H from the heater 26 for determining if the heater 26 should cease providing the heat toward the outer side surface $W_O$ of one of the workpieces $W_1$, $W_2$ of the plurality of differently sized workpieces W. In other implementations, the processor 150$_1$ may include a timer that will also contribute to determining if heat H should continue to be provided by the heater 26, or, if the heat H should no longer be provided by the heater 26.

Figure 13F:
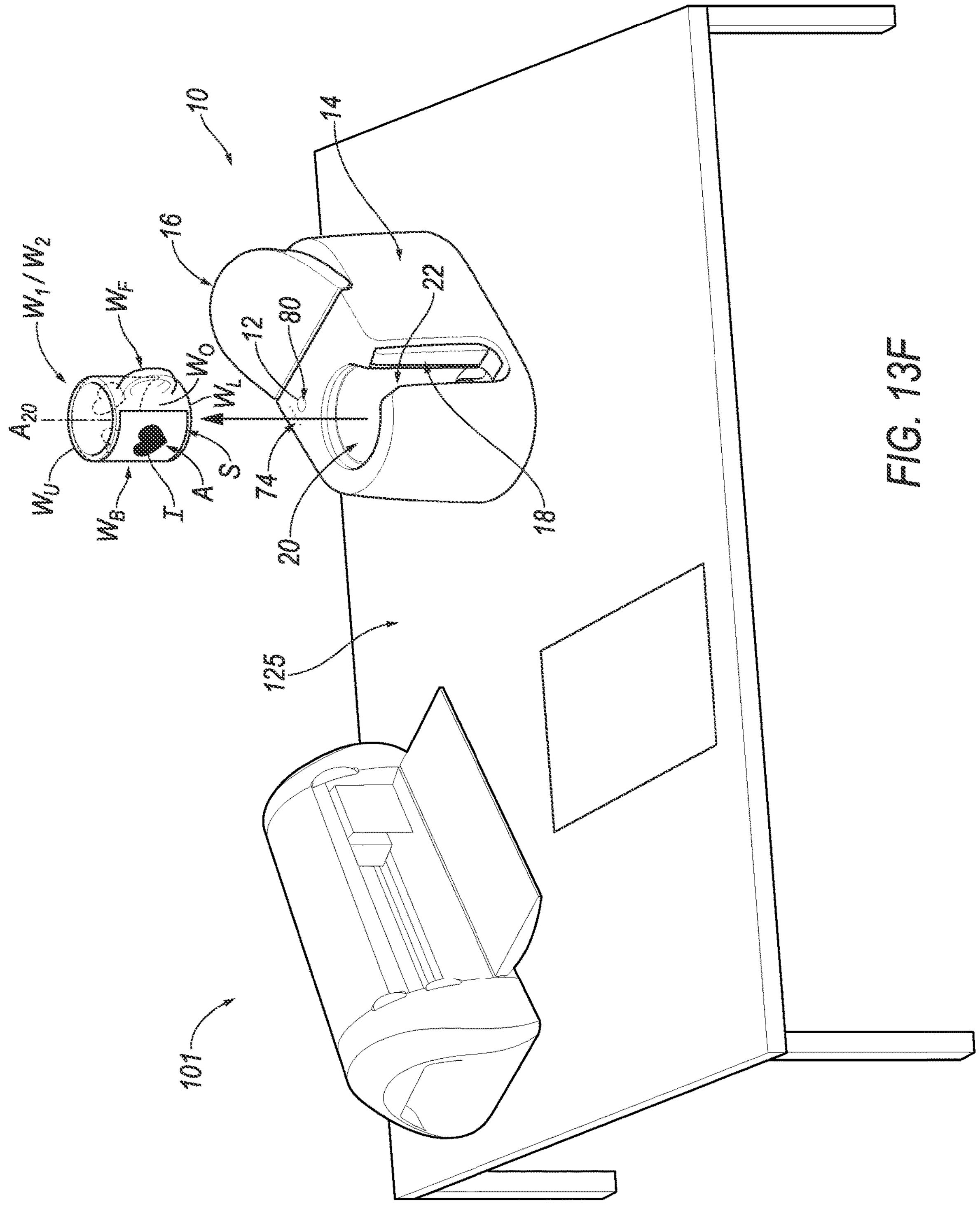

After the processor 150$_1$ determines that the heater 26 should no longer provide heat H, the processor 150$_1$ may electrically deactivate the heater 26 and/or provide an indication (e.g., a sound and/or a flashing light) to a user that the sublimation process is complete. Thereafter, as seen at FIG. 13F, the method 200 may include a step 222 of returning the workpiece engagement actuator 16 to the first (de-actuated) orientation (see also, e.g., FIG. 3) thereby causing the workpiece-engaging device 18 to be returned to the disengaged orientation (i.e., the workpiece-engaging device 18 no longer engages one or more of the outer side surface $W_O$ and the flange portion $W_F$). Thereafter, the user may remove 224 the one of the workpieces $W_1$, $W_2$ of the plurality of differently sized workpieces W from the cavity 20.

Figure 13G:
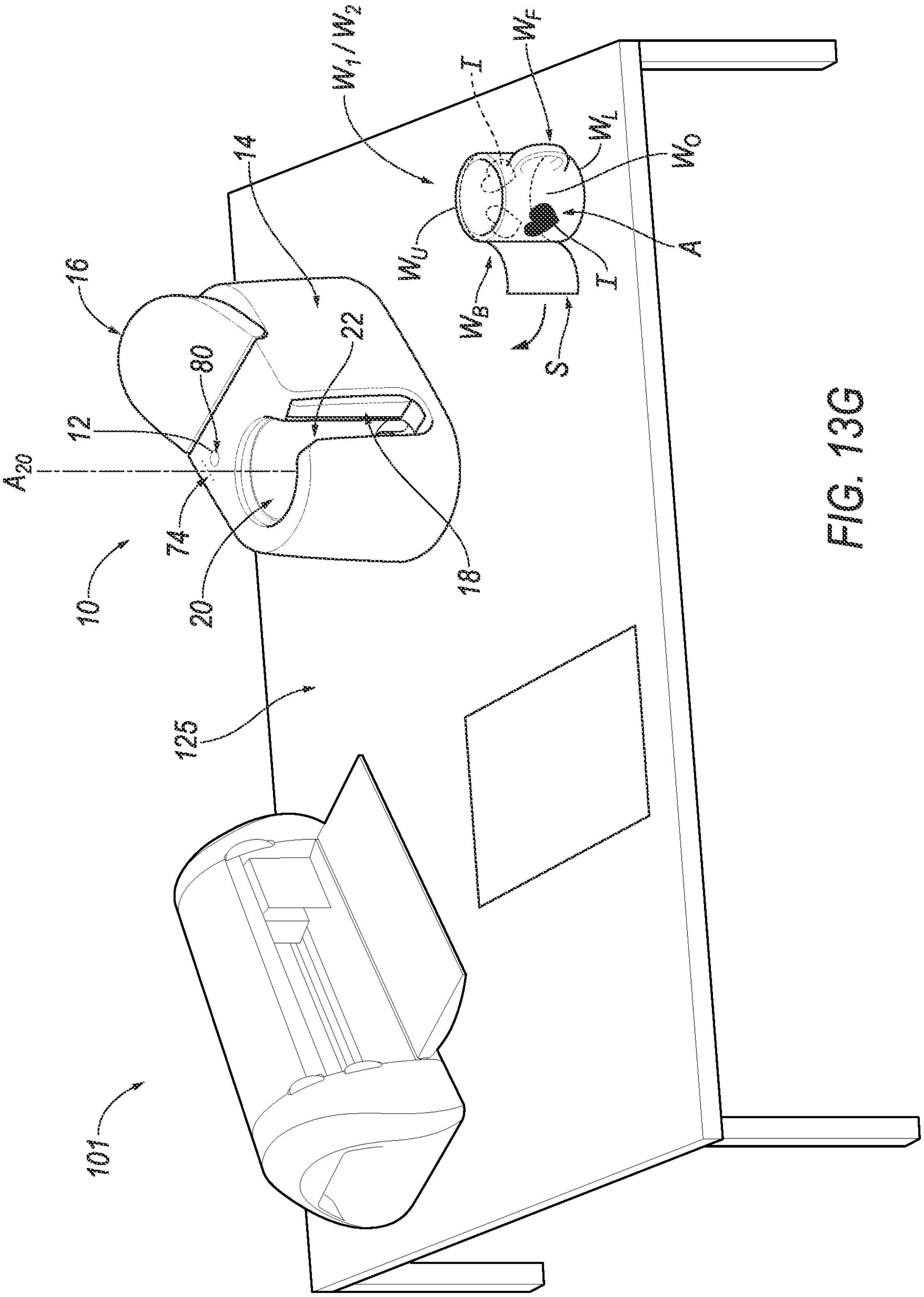
Figure 13H:
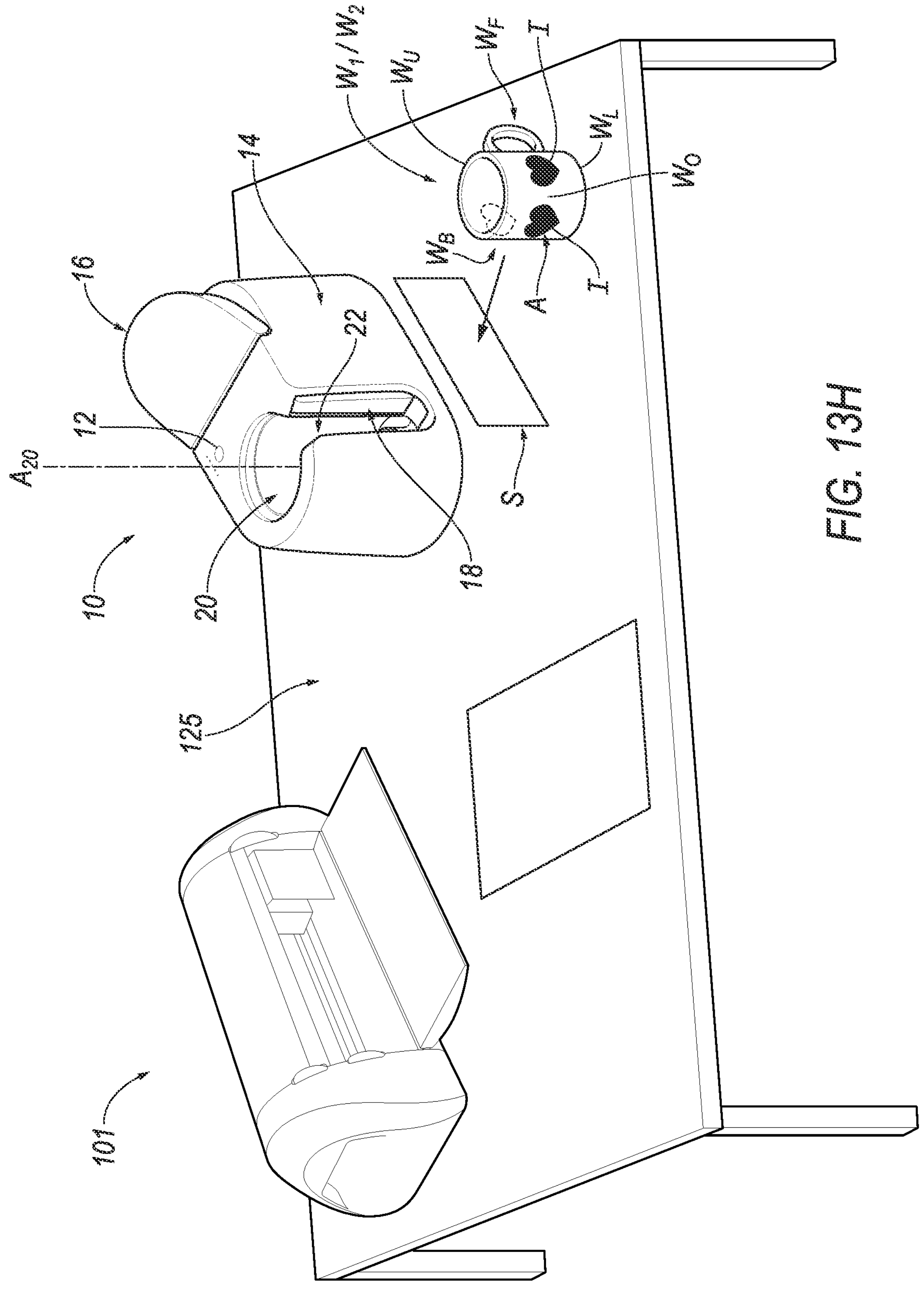

Then, referring to FIG. 13G, the method 200 may include a step 226 of optionally peeling away the transfer sheet S from the outer side surface $W_O$ of one of the workpieces $W_1$, $W_2$ of the plurality of differently sized workpieces W. As seen at FIGS. 13G and 13H, after step 226, the design A that is formed by the infusible sublimation ink I is no longer carried by the transfer sheet S, but, rather, is infused into the outer side surface $W_O$ of one of the workpieces $W_1$, $W_2$ of the plurality of differently sized workpieces W.

As discussed above, several of the steps (see, e.g., steps 202, 204, 206, and 226) of the method are optional. As such, the sublimating device could be utilized to apply heat H and a force or pressure P to one of the workpieces $W_1$, $W_2$ of the plurality of differently sized workpieces W without applying the transfer sheet S thereto, which would otherwise result in the infusible sublimation ink I being infused into the outer side surface $W_O$ of one of the workpieces $W_1$, $W_2$ of the plurality of differently sized workpieces W.

Furthermore, one or more of the other steps (see, e.g., step 216) of the method 200 may be optional; for example, if one of the workpieces $W_1$, $W_2$ of the plurality of differently sized workpieces W does not include a flange portion $W_F$, then step 216 would not occur as a result of the one of the workpieces $W_1$, $W_2$ of the plurality of differently sized workpieces W does not include a flange portion $W_F$. Accordingly, in such an instance, the method 200 may advance from step 214 to step 218, bypassing step 216.

Figure 15A:
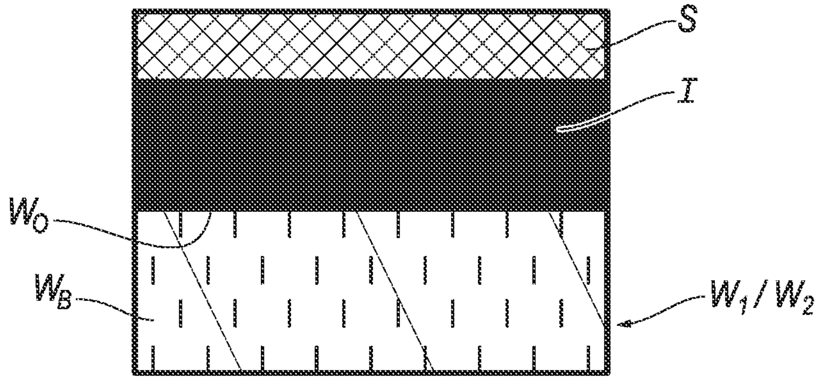
FIG. 15A is an enlarged cross-sectional view according to line 15A of FIG. 14A.
Figure 15B:
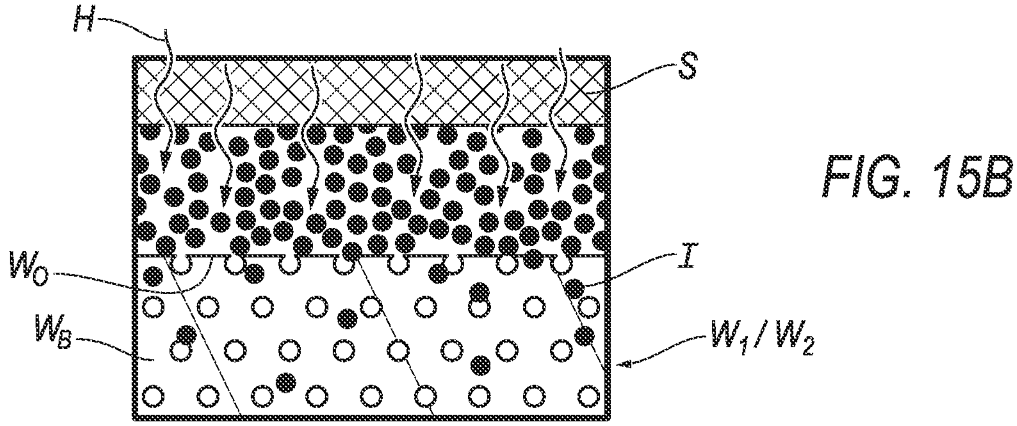
FIG. 15B is an enlarged cross-sectional view according to FIG. 15A illustrating the sublimation device of FIG. 13E that is heating the ink that is secured to the transfer sheet.

Referring to FIGS. 14A, 14B, and 15A-15D, exemplary cross-sectional views of infusible sublimation ink I being infused into the outer side surface $W_O$ of one of the workpieces $W_1$, $W_2$ of the plurality of differently sized workpieces W are shown. As seen at FIGS. 15A-15D, the sublimation device 10 performs the act of "sublimation," which may be defined as a chemical process where a solid material (see, e.g., the infusible sublimation ink I at FIG. 15A) turns into a gas (see, e.g., FIG. 15B) without going through a liquid stage. "Sublimation printing," which may also be referred to as "dye sublimation printing," may be utilized for transferring images onto suitable materials. Upon arranging the transfer sheet S (including the infusible sublimation ink I disposed thereon) proximate the heater 26 that produces heat H (see, e.g., FIG. 14A), the infusible sublimation ink I changes from: (1) a solid state disposed upon the transfer sheet S as seen at FIG. 15A; and then to (2) a gaseous state as seen at FIG. 15B that permeates into, for example, micro-pores in the outer side surface $W_O$ of one of the workpieces $W_1$, $W_2$ of the plurality of differently sized workpieces W (see, e.g., FIGS. 14B and 15B-15D).

Figure 15C:
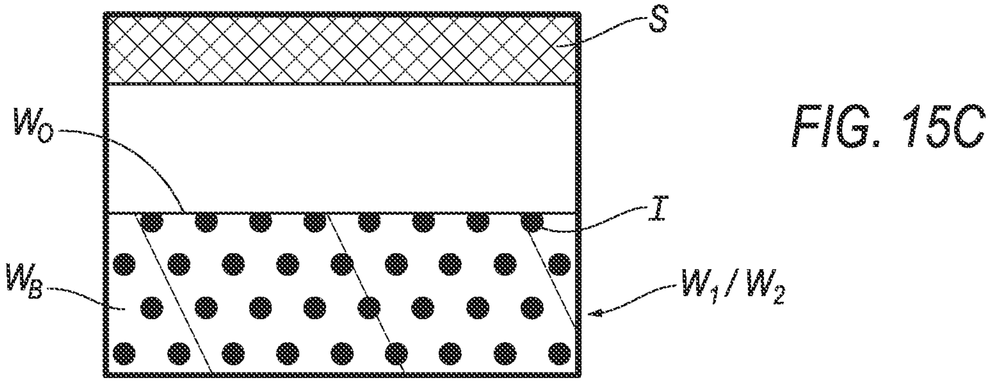
FIG. 15C is an enlarged cross-sectional view according to FIG. 15B illustrating the ink that was previously secured to the transfer sheet and is sublimating into an outer surface of the workpiece.
Figure 15D:
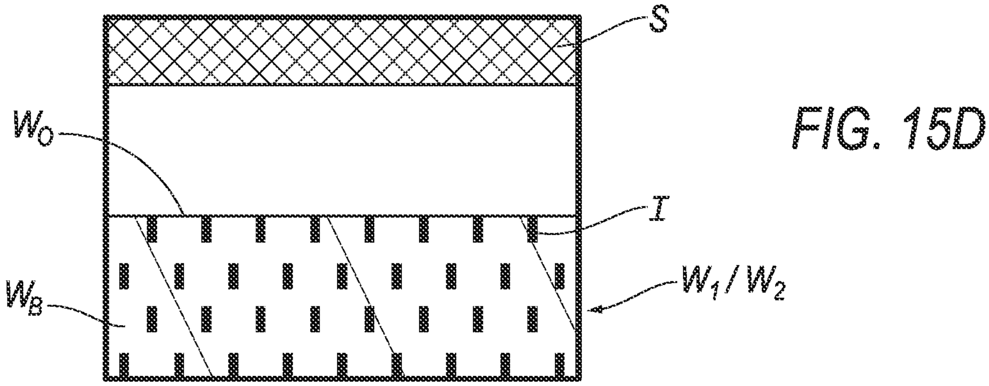
FIG. 15D is an enlarged cross-sectional view according to line 15D of FIG. 14B.

When the heat H is removed from the transfer sheet S and the outer side surface $W_O$ of one of the workpieces $W_1$, $W_2$ of the plurality of differently sized workpieces W, the infusible sublimation ink I that transitioned from a solid state (as seen at, e.g., FIG. 15A) to a gaseous state (as seen at, e.g., FIG. 15B) that permeated into the outer side surface $W_O$ of one of the workpieces $W_1$, $W_2$ of the plurality of differently sized workpieces W (as seen at, e.g., FIGS. 15C-15D) is permanently set into place by within the outer side surface $W_O$ of one of the workpieces $W_1$, $W_2$ of the plurality of differently sized workpieces W (as seen at FIG. 15D). Furthermore, with reference to FIGS. 15A-15B, not only does the heat H change the state of the infusible sublimation ink I, but it may also open, for example, micro-pores of the outer side surface $W_O$ of one of the workpieces $W_1$, $W_2$ of the plurality of differently sized workpieces W that receives the infusible sublimation ink I (as seen at, e.g., FIG. 15C) that changed from a solid state to a gaseous state.

Once the heat H and pressure P are released, the infusible sublimation ink I that is "gassed" into the outer side surface $W_O$ of one of the workpieces $W_1$, $W_2$ of the plurality of differently sized workpieces W returns to the solid state, and, as seen at FIGS. 15C-15D, the micro-pores of the outer side surface $W_O$ of one of the workpieces $W_1$, $W_2$ of the plurality of differently sized workpieces W transitions from the open state back to the closed state, thereby trapping the infusible sublimation ink I within the outer side surface $W_O$ of one of the workpieces $W_1$, $W_2$ of the plurality of differently sized workpieces W as seen at FIG. 15D.

Figure 16:
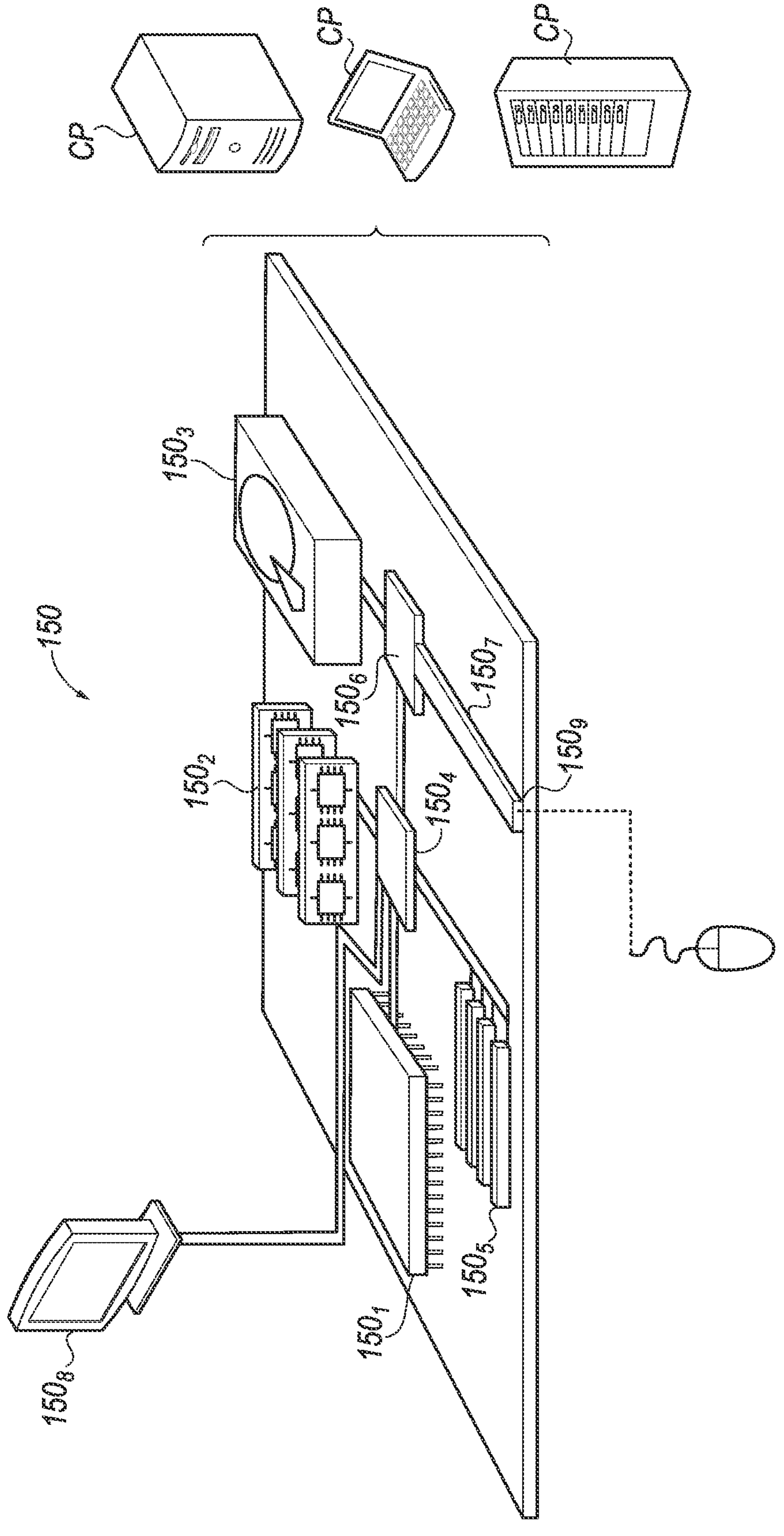
FIG. 16 is a schematic view of an example computing device that may be used to implement the systems and methods described herein.

FIG. 16 is schematic view of an example CPU 150, which may be alternatively referred to as a computing device that may be used to implement the systems and methods described in this document. The components 150$_1$, 150$_2$, 150$_3$, 150$_4$, 150$_5$, and 150$_6$ shown at FIG. 16, their connections and relationships, and their functions, are meant to be exemplary only, and are not meant to limit implementations of the inventions described and/or claimed in this document.

The computing device 150 includes a processor 150$_1$, memory 150$_2$, a storage device 150$_3$, a high-speed interface/controller 150$_4$ connecting to the memory 150$_2$ and high-speed expansion ports 150$_5$, and a low speed interface/controller 150$_6$ connecting to a low speed bus 150$_7$ and a storage device 150$_3$. Each of the components 150$_1$, 150$_2$, 150$_3$, 150$_4$, 150$_5$, and 150$_6$, are interconnected using various busses, and may be mounted on a common motherboard or in other manners as appropriate. The processor 150$_1$ can process instructions for execution within the computing device 150, including instructions stored in the memory 150$_2$ or on the storage device 150$_3$ to display graphical information for a graphical user interface (GUI) on an external input/output device, such as display 150$_8$ coupled to high speed interface 150$_4$. In other implementations, multiple processors and/or multiple buses may be used, as appropriate, along with multiple memories and types of memory. Also, multiple computing devices 150 may be connected, with each device providing portions of the necessary operations (e.g., as a server bank, a group of blade servers, or a multi-processor system).

The memory 150$_2$ stores information non-transitorily within the computing device 150. The memory 150$_2$ may be a computer-readable medium, a volatile memory unit(s), or non-volatile memory unit(s). The non-transitory memory 150$_2$ may be physical devices used to store programs (e.g., sequences of instructions) or data (e.g., program state information) on a temporary or permanent basis for use by the computing device 150. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 150$_3$ is capable of providing mass storage for the computing device 150. In some implementations, the storage device 150$_3$ is a computer-readable medium. In various different implementations, the storage device 150$_3$ may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 150$_2$, the storage device 150$_3$, or memory on processor 150$_1$.

The high speed controller 150$_4$ manages bandwidth-intensive operations for the computing device 150, while the low speed controller 150$_6$ manages lower bandwidth-intensive operations. Such allocation of duties is exemplary only. In some implementations, the high-speed controller 150$_4$ is coupled to the memory 150$_2$, the display 150$_8$ (e.g., through a graphics processor or accelerator), and to the high-speed expansion ports 150$_5$, which may accept various expansion cards (not shown). In some implementations, the low-speed controller 1860 is coupled to the storage device 150$_3$ and a low-speed expansion port 150$_9$. The low-speed expansion port 150$_9$, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 150 may be implemented in a number of different forms, as shown in the figure. For example, it may be implemented in one or a combination of the sublimating device 10 and a laptop computer CP.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer.

Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

As noted above, each of the embodiments described in the detailed description above may include any of the features, options, and possibilities set out in the present disclosure, including those under the other independent embodiments, and may also include any combination of any of the features, options, and possibilities set out in the present disclosure and figures. Further examples consistent with the present teachings described herein are set out in the following numbered clauses:

Clause 1: A method of operating a sublimating device, the method comprising: providing heat to a cavity of the sublimating device by increasing: a temperature of a heater to a predetermined target temperature; and a temperature of a base heater to a predetermined standby temperature; determining a difference between the predetermined target temperature and a reduced temperature of the heater; and determining whether a workpiece is arranged in the cavity based on the difference between the predetermined target temperature and a reduced temperature.

Clause 2: The method of clause 1, further comprising sublimating infusible sublimation ink onto an outer side surface of the workpiece.

Clause 3: The method of clause 2, wherein prior to sublimating infusible ink, the method further comprises applying a transfer sheet including the infusible sublimation ink adjacent the outer side surface of the workpiece.

Clause 4: The method of clause 2 or 3, further comprising removing the workpiece from the cavity.

Clause 5: The method of clause 4, wherein prior to the removing the workpiece from the cavity, the method further comprises applying a transfer sheet including the infusible sublimation ink adjacent the outer side surface of the workpiece, and wherein after removing the workpiece from the cavity, the method further includes: removing the transfer sheet from the outer side surface of the workpiece; and revealing that the infusible sublimation ink has been sublimated to the outer side surface of the workpiece.

Clause 6: The method of clause 1, wherein prior to providing the heat to the cavity, the method further comprises powering-on the sublimating device for providing the heat to the cavity.

Clause 7: The method of clause 6, wherein prior to removing the workpiece from the cavity, the method further comprises powering-off the sublimating device.

Clause 8: The method of clause 6 or 7, further comprising: determining that the workpiece is not arranged in the cavity based on the difference between the predetermined target temperature and the reduced temperature; and automatically powering-off the sublimating device based on determining that the workpiece is not arranged in the cavity.

Clause 9: The method of any of clauses 1 through 8, further comprising: automatically increasing the reduced temperature of the heater to the predetermined target temperature; and automatically increasing the predetermined standby temperature of the base heater to a predetermined target temperature of the base heater.

Clause 10: A method of operating a sublimating device having an inner surface defining a cavity, the method comprising: receiving a first workpiece at least partially in the cavity, the first workpiece including a first outer side surface defining a first diameter; engaging the first outer side surface with the inner surface; receiving a second workpiece at least partially in the cavity, the second workpiece including a second outer side surface defining a second diameter different than the first diameter; and engaging the second outer side surface with the inner surface.

Clause 11: The method of clause 10, further comprising automatically applying a radially-inwardly-directed pressure and heat from a heater of the sublimating device to the first outer side surface.

Clause 12: The method of clause 10 or 11, wherein receiving the first workpiece at least partially in the cavity further comprises arranging a lower end surface of the first workpiece adjacent a base heater that at least partially forms the cavity, wherein the method further comprises automatically applying: radially-inwardly-directed heat from a heater of the sublimating device to the first outer side surface; and axially-upwardly-directed heat from the heater to the lower end surface.

Clause 13: The method of any of clauses 10 through 12, further comprising moving a workpiece engagement actuator of the sublimating device from an actuated orientation to a de-actuated orientation to disengaged the inner surface from the first outer side surface.

Clause 14: The method of claim 13, further comprising removing the first workpiece from the cavity.

Clause 15: The method of any of clauses 10 through 14, further comprising sublimating a design on the first outer side surface.

Clause 16: The method of clause 15, further comprising arranging a transfer sheet including an infusible sublimation ink opposite the first outer side surface.

Clause 17: The method of any of clauses 10 through 16, further comprising forming a flange-receiving gap in the sublimating device.

Clause 18: The method of clause 17, further comprising arranging a flange portion of the first workpiece within the flange-receiving gap such that the flange portion extends radially from the cavity.

Clause 19: The method of clause 18, further comprising engaging the flange portion with a workpiece-engaging device of the sublimating device.

Clause 20: The method of any of clauses 10 through 19, wherein: engaging the first outer side surface with the inner surface includes defining a third diameter with the inner surface; and engaging the second outer side surface with the inner surface includes defining a fourth diameter with the inner surface, the fourth diameter being greater than the first diameter.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method of operating a sublimating device, the method comprising:

providing heat to a cavity of the sublimating device by increasing a temperature of a heater to a predetermined target temperature;

determining a difference between the predetermined target temperature and a current temperature of the heater;

determining whether a workpiece is arranged in the cavity based on the determined difference between the predetermined target temperature and the current temperature of the heater; and in response to determining that the workpiece is arranged in the cavity:

providing additional heat to the cavity to increase the current temperature of the heater to the predetermined target temperature; and sublimating infusible sublimation ink onto an outer side surface of the workpiece; and in response to determining that the workpiece is not arranged in the cavity, automatically Dowering-off the sublimating device.

2. The method of claim 1, wherein prior to sublimating infusible ink, the method further comprises applying a transfer sheet including the infusible sublimation ink adjacent the outer side surface of the workpiece.

3. The method of claim 1, further comprising removing the workpiece from the cavity.

4. The method of claim 3, wherein:

prior to the removing the workpiece from the cavity, the method further comprises applying a transfer sheet including the infusible sublimation ink adjacent the outer side surface of the workpiece; and after removing the workpiece from the cavity, the method further comprises:

removing the transfer sheet from the outer side surface of the workpiece; and revealing that the infusible sublimation ink has been sublimated to the outer side surface of the workpiece.

5. The method of claim 3, wherein prior to providing the heat to the cavity, the method further comprises powering-on the sublimating device for providing the heat to the cavity.

6. The method of claim 5, wherein prior to removing the workpiece from the cavity, the method further comprises powering-off the sublimating device.

7. The method of claim 1, further comprising:

automatically increasing the temperature of the heater to the predetermined target temperature.

8. The method of claim 1, wherein providing heat to the cavity of the sublimating device further comprises increasing a temperature of a base heater to a predetermined standby temperature.

9. The method of claim 8, further comprising automatically increasing the predetermined standby temperature of the base heater to a predetermined target temperature of the base heater.

* * * * *